United States Patent
Choi et al.

(10) Patent No.: US 11,695,114 B2
(45) Date of Patent: Jul. 4, 2023

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Hyun Jong Yu, Cheongju-si (KR); Jung Bae Park, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 232 days.

(21) Appl. No.: 17/097,094

(22) Filed: Nov. 13, 2020

(65) Prior Publication Data
US 2021/0305558 A1    Sep. 30, 2021

(30) Foreign Application Priority Data

Mar. 27, 2020  (KR) .................. 10-2020-0037343

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC .......... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 2017/0125809 A1 | 5/2017 | Kim et al. |
| 2020/0083531 A1* | 3/2020 | Choi ............ H01M 4/131 |

FOREIGN PATENT DOCUMENTS

| EP | 3 282 506 A1 | 2/2018 | |
| EP | 3 331 067 A1 | 6/2018 | |
| EP | 3 613 705 A2 | 2/2020 | |
| EP | 3 613 707 A2 | 2/2020 | |
| EP | 3613707 * | 2/2020 | ............ H01M 4/525 |
| EP | 3 613 705 A3 | 3/2020 | |
| EP | 3 613 707 A3 | 3/2020 | |
| KR | 10-2018-0076601 A | 7/2018 | |
| KR | 10-2020-0029961 A | 3/2020 | |
| WO | 2019/088805 A2 | 5/2019 | |

* cited by examiner

*Primary Examiner* — Jonathan Crepeau
*Assistant Examiner* — Angela J Martin
(74) *Attorney, Agent, or Firm* — Studebaker & Brackett PC

(57) ABSTRACT

The present invention relates to a positive electrode active material which has the structural stability of a lithium composite oxide constituting a positive electrode active material and a lithium secondary battery including the same. The lithium composite oxide constituting the positive electrode active material according to the present invention is able to reduce the surface area and grain boundary of secondary particles having a side reaction with an electrolyte solution, thereby improving high-temperature stability and reducing gas generation caused by the positive electrode active material, and the structural stability of the lithium composite oxide may be improved using a cation-mixing layer covering the surface of a primary particle.

11 Claims, 17 Drawing Sheets

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2020-0037343, filed on Mar. 27, 2020, the disclosure of which is incorporated herein by reference in its entirety.

BACKGROUND

1. Field of the Invention

The present invention relates to a positive electrode active material which has improved structural stability of a lithium composite oxide constituting a positive electrode active material, and a lithium secondary battery including the same.

2. Discussion of Related Art

Compared with other rechargeable battery systems, a lithium secondary battery has advantages such as high driving voltage, light weight, miniaturization, a non-memory effect, a low self-discharge rate, a long cycle life, and a high energy density, and thus is widely used in mobile phones, notebook computers, tablet computers and other mobile terminals.

In addition, in recent years, in terms of environmental protection, electric vehicles have been developed rapidly under the promotion of the government and automobile manufacturers, and a lithium secondary battery is considered as an ideal power of the next generation electric vehicle due to its excellent performance.

As a positive electrode active material of the lithium secondary battery, a lithium-based composite oxide is used, and lithium-cobalt composite oxide ($LiCoO_2$) having a high operating voltage and an excellent capacity characteristic is mainly used. However, $LiCoO_2$ is decreased in high-temperature stability due to instability of a crystal structure caused by delithiation, and has a limitation in being used as a power source in the field requiring a large-capacity battery system such as an electric vehicle because of its high price.

As a material for replacing $LiCoO_2$, lithium-manganese composite oxide ($LiMnO_2$ or $LiMn_2O_4$), lithium-iron phosphate ($LiFePO_4$) or lithium-nickel composite oxide ($LiNiO_2$) has been developed. Here, for the reason that a high-capacity battery can be implemented as the lithium-nickel composite oxide has a high reversible capacity of approximately 200 mAh/g, research and development are more actively performed.

However, $LiNiO_2$ has a poor high-temperature stability than $LiCoO_2$, and there is a problem in that a positive electrode active material is degraded by itself when there is an internal short circuit by a pressure from outside in a charged state or the burst and burning of a battery occur due to side reactions on the interface and surface between an electrolyte solution and a positive electrode active material.

Accordingly, there is a demand for the development of a positive electrode active material that can maintain an excellent reversible capacity of $LiNiO_2$ and improve low high-temperature stability.

Meanwhile, a lithium secondary battery may be classified into a can-type secondary battery in which an electrode assembly is built in a metal can and a pouch-type secondary battery in which an electrode assembly is built in a pouch formed of a sheet such as an aluminum laminate according to the shape of a battery case.

In the case of a pouch-type secondary battery, due to its light weight and less possibility of leakage of an electrolyte solution, the same amount of secondary batteries can be implemented with a relatively small volume and mass, but when the inner pressure of a battery case rapidly increases, there is explosion hazard, and therefore, one of the important tasks is achievement of stability by controlling the generation of a gas, which is the main cause of increasing the inner pressure of a battery case.

For example, when an overcurrent above the limit flows in a secondary battery, the inner temperature of the battery rapidly increases, causing the decomposition reaction of an electrolyte solution to generate a gas. However, a gas may be generated by side reactions at the interface between an electrolyte solution and a positive electrode active material and on the surfaces thereof.

SUMMARY OF THE INVENTION

The present invention is directed to providing a positive electrode active material which maintains an excellent reversible capacity of $LiNiO_2$ and improves low thermal stability or structural stability, and a secondary battery including the same.

The present invention is also directed to providing a positive electrode active material which is able to prevent a battery swelling phenomenon caused by the generation of a gas in a secondary battery by reducing the possibility of side reactions at the interface between an electrolyte solution and a positive electrode active material and the surfaces thereof, and a lithium secondary battery including the same.

The present invention is also directed to providing a positive electrode active material which is improved in structural stability of a lithium composite oxide by covering the surface of a primary particle with a cation-mixing layer, and a lithium secondary battery including the same.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

One aspect of the present invention provides a positive electrode active material including a lithium-based composite oxide having a single crystal structure.

The positive electrode active material includes a cation-mixing layer present on the surface of the lithium-based composite oxide, and a thickness (d1) of the cation-mixing layer may be present within a range of more than 0.0008 and less than 0.0052, with respect to the average particle diameter (x1) of the primary particle.

Another aspect of the present invention provides a positive electrode for a lithium secondary battery, which includes the positive electrode active material.

Still another aspect of the present invention provides a lithium secondary battery, which includes the positive electrode.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
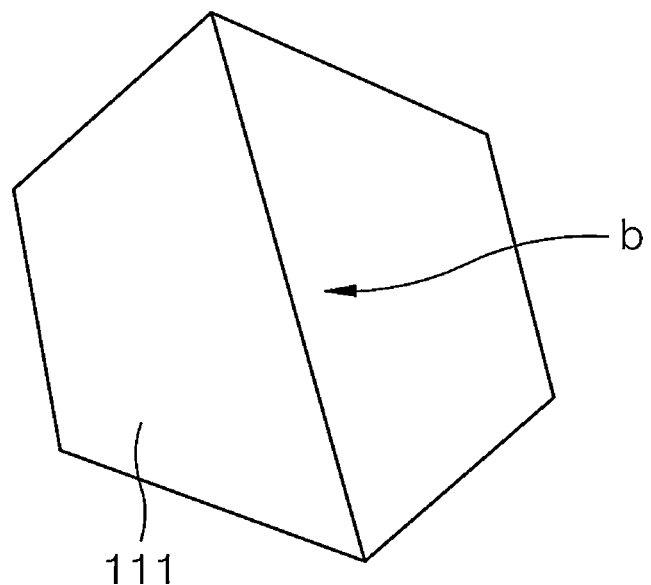
FIGS. 1 to 3 are schematic diagrams of the cross-section of secondary particles, which may be included in positive electrode active materials according to various embodiments of the present invention.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Description of Terms

The term "lithium-based composite oxide" used herein is an oxide enabling the intercalation and deintercalation of lithium ions, which includes lithium and a metal element, and particularly, the lithium-based composite oxide used herein may be a lithium-nickel composite oxide which includes lithium and nickel. In addition, the term "lithium-based composite oxide" used herein may be defined as a primary particle constituting a positive electrode active material. The term "single crystal" used herein refers to a crystal in a state in which a grain or grain boundary is not included in a particle. In addition, the term "primary particle" used herein refers to a particle present independently without forming an aggregate. Accordingly, the "lithium-based composite oxide having a single crystal structure" refers to a particle in a state in which a primary particle consisting of a lithium-based composite oxide is formed of a plurality of grains, or there is no grain boundary in a primary particle.

The term "secondary particle" used herein refers to a primary particle, which is the above-described lithium-based composite oxide, as it is or a particle in which at least two primary particles are aggregated. In this case, in the positive electrode active material, a secondary particle consisting of a single primary particle and/or a secondary particle in which at least two primary particles are aggregated may exist together. When a secondary particle is formed by aggregating at least two primary particles, there is a grain boundary formed at the interface between the two primary particles in the secondary particle.

The term "grain boundary density" used herein refers to the number of grain boundaries formed as a secondary particle includes at least two primary particles, and the larger the number of primary particles present in a secondary particle, the higher the grain boundary density, and the smaller the number of primary particles present in a secondary particle, the lower the grain boundary density.

The grain boundary density may be calculated by the following formula:

Grain boundary density=(the number of interfaces between primary particles in secondary particle/ the number of primary particles constituting secondary particle)

When the number of primary particles present in a secondary particle is 1, the grain boundary density calculated according to the equation is 0, and when the number of primary particles present in a secondary particle is 3 or more, the grain boundary density calculated according to the equation will exceed 0.5.

However, the secondary particle in the present invention may be a particle consisting of a single primary particle having a single crystal structure, but the present invention is not necessarily limited thereto. That is, the secondary particle in the present invention will be understood as being consist of a single crystal particle, or as a particle formed by aggregating at least two single crystal particles. The definition of this secondary particle will be more clearly explained by the definition of a positive electrode active material to be described below.

The term "positive electrode active material" used herein, as a broad concept including the above-described secondary particles, may be a positive electrode active material consisting of a single secondary particle as is, but in the present invention, an assembly of multiple secondary particles having the same and/or different grain boundary densities may be defined as a positive electrode active material.

Accordingly, in the definition of a positive electrode active material to be described below, the description of a secondary particle having the characteristics of an assembly of multiple secondary particles and the description of a primary particle constituting the secondary particle need to be understood separately.

Hereinafter, a positive electrode active material according to the present invention and a lithium secondary battery including the same will be described in further detail.

Positive Electrode Active Material

The surface area of a secondary particle included in a positive electrode active material and the grain boundary defined by primary particles present in the secondary particle are regions in which side reactions at the interface between a positive electrode active material and an electrolyte solution and the surfaces thereof. Here, the grain boundary defined by the primary particles present in the secondary particle will be understood as, for example, an interface between two adjacent primary particles.

Here, by reducing the surface area of the secondary particle and the grain boundary defined by primary particles in the secondary particle, the thermal stability of the positive electrode active material can be improved, and problems caused by the instability of the positive electrode active material (e.g., a decrease in storage stability such as gas generation) can be prevented or relieved.

The positive electrode active material for a lithium secondary battery according to one embodiment of the present invention includes a secondary particle consisting of primary particles, formed of a lithium-based composite oxide having a single crystal structure.

Particularly, as the primary particle constituting the secondary particle has a single crystal structure, the surface area of the primary particle in the secondary particle and the grain boundary partitioned by the primary particle present in the secondary particle can be reduced. Additionally, as the primary particle constituting the secondary particle has an isotropic lithium ion diffusion path in the major axis direction, lithium ions in the secondary particle are concentrated in one direction, instead of being diffused in multiple directions, and thus the lithium ion conductivity in the secondary particle can be improved.

Figure 2:
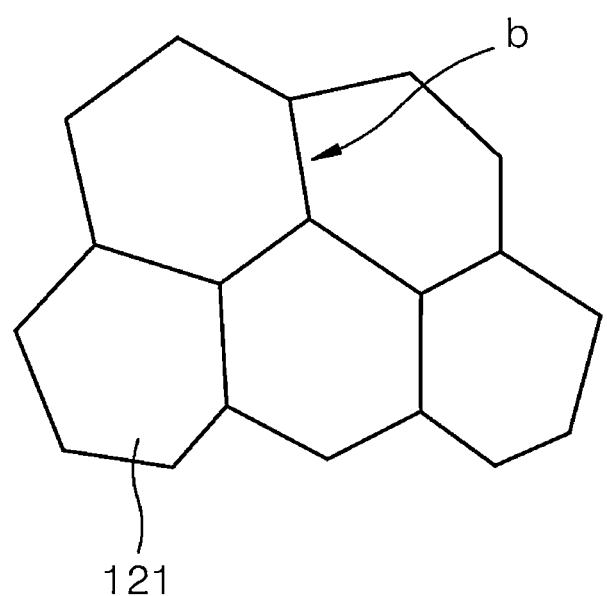
Figure 3:
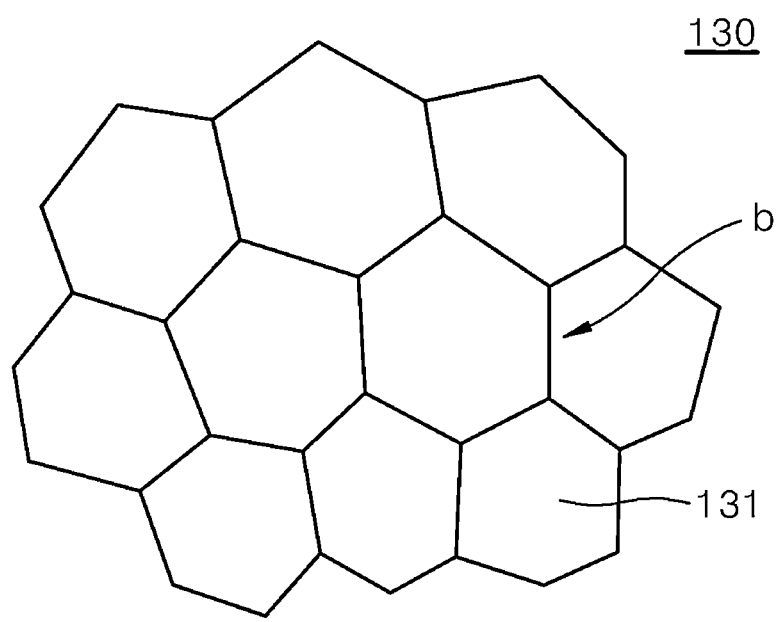

FIGS. 1 to 3 schematically show that the cross-sections of secondary particles that may be included in positive electrode active materials according to various embodiments of the present invention.

As the secondary particle 110, 120 or 130 included in the positive electrode active material shown in FIG. 1, 2 or 3, respectively, is formed by aggregating 1 to 10 primary particles 111, 121 or 131, compared with a secondary particle formed by aggregating tens to hundreds of primary particles, it has relatively a small surface area, resulting in possibility of reducing a surface area in which a side reaction with an electrolyte solution occurs. In addition, the smaller the number of primary particles forming a secondary particle, the lower the density of grain boundaries, and therefore, a side reaction at the grain boundary of a secondary particle may also be reduced.

In addition, according to the present invention, primary particles constituting multiple secondary particles included in a positive electrode active material may be increased in possibility of having an isotropic lithium ion diffusion path in the major axis direction. As such, as a ratio of isotropic lithium ion diffusion paths in the major axis direction in a secondary particle is increased, it is possible to improve lithium ion conductivity and electron conductivity by a positive electrode active material.

In one embodiment, the positive electrode active material according to the present invention may be an assembly of secondary particles having the same or different grain boundary densities.

In the present invention, the grain boundary density may be calculated by the following equation.

Grain boundary density=(the number of interfaces between primary particles in secondary particle/the number of primary particles constituting secondary particle)

Secondary particles having different grain boundary densities may have different physical and chemical characteristics. As a physical characteristic that can be changed according to a different grain boundary density, there may be, for example, a difference in surface area before/after pressing of secondary particles, and as a chemical characteristic, there may be, for example, a difference in ratio of side reactions on the surfaces of secondary particles and an electrolyte solution and/or at the interface therebetween.

Specifically, in the positive electrode active material according to the present invention, the proportion of secondary particles having a grain boundary density of 0.5 or less among the plurality of secondary particles constituting the positive electrode active material may be 30% or more, preferably, 50% or more, and more preferably, 70% or more.

For example, when the secondary particle consists of a single primary particle having a single crystal structure, the grain boundary density is 0 (number of interfaces between primary particles in secondary particle=0/number of primary particles constituting secondary particle=1), and when the secondary particle consists of two primary particles having a single crystal structure, the grain boundary density is 0.5.

That is, as the number of interfaces between primary particles in the secondary particle is smaller, the grain boundary density may have a relatively small value. Here, when the number of primary particles constituting the secondary particle is larger, the number of interfaces between primary particles in a secondary particle is also increased, and therefore, to have a grain boundary density of 0.5 or less, the secondary particle has to consist of a single primary particle having a single crystal structure or two primary particles having a single crystal structure.

For example, the positive electrode active material according to the present invention may include a secondary particle consisting of one or two primary particles (hereinafter, referred to as a "first aggregate" for convenience), a secondary particle consisting of three to six primary particles (hereinafter, referred to as a "second aggregate" for convenience) and a secondary particle consisting of seven to ten primary particles (hereinafter, referred to as a "third aggregate" for convenience).

The first aggregate 110 shown in FIG. 1 includes one or two primary particles 111 forming a secondary particle, and since it has a smaller number of primary particles forming a secondary particle than that of a second aggregate and a third aggregate, it is possible to reduce a region in which a side reaction with an electrolyte solution occurs.

In addition, the number of grain boundaries (b) formed by the primary particles 111 in the first aggregate 110 may be 1 or less. Accordingly, compared with when the number of grain boundaries is 2 or more, the possibility of a side reaction with an electrolyte solution at a grain boundary may be reduced.

Such a first aggregate may account for 30% or more of the assembly of secondary particles constituting a positive electrode active material. Here, the proportion (%) of the first aggregate in the assembly of secondary particles means a proportion (%) of the number of first aggregates of the total number of secondary particles constituting an assembly.

When the proportion of first aggregates in the assembly of the secondary particles constituting the positive electrode active material is less than 30%, the proportion of the first aggregates in the assembly is reduced, and thus the average surface area and grain boundary density of the secondary particles constituting the positive electrode active material increase. Accordingly, the possibility of a side reaction between the positive electrode active material and the electrolyte solution may increase, resulting in degradation of the high-temperature stability and a storage characteristic of the positive electrode active material.

Meanwhile, as a calcination temperature increases, the proportion of the first aggregates in the assembly of the secondary particles constituting the positive electrode active material is able to increase, but when the calcination temperature is excessively high, the possibility of deteriorating the positive electrode active material may rather increase.

In addition, in the second aggregate 120 shown in FIG. 2, the number of primary particles 121 forming a secondary particle is 3 to 6, and the second aggregate 120 may be present at 70% or more, preferably, 20 to 70% of the assembly of the secondary particles constituting a positive electrode active material.

In addition, in the third aggregate 130 shown in FIG. 3, the number of primary particles 131 forming a secondary particle is 7 to 10, and the third aggregate 130 may be present at 10% or less of the assembly of the secondary particles constituting a positive electrode active material.

Here, the positive electrode active material may also include secondary particles formed by aggregating a larger number of primary particles than a third aggregate (a secondary particle consisting of 7 to 10 primary particles). In this case, the proportions of the third aggregate in the assembly of secondary particles and secondary particles formed by aggregating a larger number of primary particles than that of the third aggregate are preferably 10% or less.

When the proportion of the first aggregate is 70%, and the proportion of the second aggregate is reduced to less than 20%, consequently, the proportion of the second aggregate compared with the third aggregate decreases, and therefore, the average surface area and grain boundary density of secondary particles constituting a positive electrode active material increase, which may serve as a cause of degrading high-temperature stability and storage of the positive electrode active material.

Meanwhile, when the proportion of the second aggregate is more than 30% in the assembly of the secondary particles constituting a positive electrode active material, the proportion of the second aggregate relative to the first aggregate relatively increases, and therefore, the average surface area and grain boundary density of the secondary particles constituting the positive electrode active material may increase.

In addition, the average particle size of primary particles, such as a lithium-based composite oxide having a single crystal structure, is preferably 1.0 to 5.0 μm. Since the average particle size of the primary average, such as the lithium-based composite oxide having a single crystal structure, is present within a range of 1.0 to 5.0 μm, the optimal density of the positive electrode active material forming of the lithium-based composite oxide may be achieved, and the effect of improving structural stability by a cation-mixing layer to be described below may be maximized.

In addition, the average particle size of secondary particles may vary according to the number of the aggregated primary particles, but may be 1.0 to 20.0 μm. Preferably, the secondary particles include small secondary particles and large secondary particles, wherein the small secondary particles have an average particle size of 1.0 to 5.0 μm, and the large secondary particles may have an average particle size of 10.0 to 20.0 μm. Accordingly, the average particle of the assembly of the secondary particles in which the small secondary particles and the large secondary particles may be 3.0 to 18.0 μm.

As such, the positive electrode active material according to the present invention may be an assembly of secondary particles having the same or different grain boundary densities and an assembly in which small secondary particles and large secondary particles, which have different average particle diameters, are mixed. Due to the characteristics of the assemblies of secondary particles, the structural stability of the positive electrode active material may be improved, and further, the high-temperature stability and storage stability of a lithium secondary battery using the positive electrode active material are able to be achieved.

The lithium-based composite oxide constituting the positive electrode active material according to the present invention may be represented by Formula 1 below.

$$Li_aNi_{1-(b+c+d+e)}Co_bM1_cM2_dM3_eO_f \quad \text{[Formula 1]}$$

Here, M1 is Mn or Al, M2 and M3 are each independently selected from Al, B a, B, Ce, Cr, Mg, Mn, Mo, Na, K, P, Sr, Ti, W, Nb and Zr, and M1 to M3 are different metals (0.90≤a≤1.05, 0≤b≤0.20, 0≤c≤0.20, 0≤d≤0.05, 0≤e≤0.05, and 1.0≤f≤2.0).

Here, M3 is a metal different from M1, which may be added as a flux in the preparation of the lithium-based composite oxide of Formula 1, and the flux may serve to lower a melting point to promote particle growth, and therefore, it is possible to induce a cation-mixing layer to be described below to be formed in a suitable range.

In addition, the positive electrode active material according to the present invention may include a cation-mixing layer present on the surface of the lithium-based composite oxide represented by Formula 1.

Specifically, the positive electrode active material may include primary particles, formed of the lithium-based composite oxide having a single crystal structure, and secondary particles formed by aggregating the primary particles, and the cation-mixing layer may be present on the surface of at least one selected from the primary particle and the secondary particle.

Here, the cation-mixing layer may include a composite oxide represented by Formula 2 below, wherein the composite oxide represented by Formula 2 below is an oxide different from the lithium-based composite oxide represented by Formula 1.

$$Li_gNi_{1(h+i+j+k)}Co_hM4_iM5_jM6_kO_l \quad \text{[Formula 2]}$$

Here, M4 is Mn or Al, M5 and M6 are each independently selected from Al, Ba, B, Ce, Cr, Mg, Mn, Mo, Na, K, P, Sr, Ti, W, Nb and Zr, and M4 to M6 are different metals (0.0≤g≤1.05, 0≤h≤0.20, 0≤i≤0.20, 0≤j≤0.05, 0≤k≤0.05, and 1.0≤l≤2.0).

As there is the cation-mixing layer including the composite oxide represented by Formula 1 on the surface of the lithium-based composite oxide, the structural stability of the lithium-based composite oxide, which is a primary particle, may be improved.

More specifically, the composite oxide included in the cation-mixing layer may be represented by Formula 3 below:

$$Li_mNi_nO_l \quad \text{[Formula 3]}$$

(0.0≤m≤0.5, 0.0≤n≤1, and 1.0≤l≤2.0)

The composite oxide included in the cation-mixing layer may have a crystal structure selected from a layered structure, a rocksalt structure and a spinel structure, or have a crystal structure in which composite oxides having at least one crystal structure selected from a layered structure, a rocksalt structure and a spinel structure are mixed. However, in this case, the composite oxide included in the cation-mixing layer may have a crystal structure different from the lithium-based composite oxide represented by Formula 1.

The thickness of the cation-mixing layer present on the surface of the lithium-based composite oxide, which is a primary particle constituting the positive electrode active material, may be 0.24 to 12.03 nm, and the ratio of the thickness of the cation-mixing layer to the average particle size of the primary particle may range from more than 0.0008 and less than 0.0052.

When the ratio of the thickness of the cation-mixing layer to the average particle size of the primary particle is 0.0008 or less, the effect of improving the structural stability of the lithium-based composite oxide due to the cation-mixing layer may be insufficient. Meanwhile, the ratio of the thickness of the cation-mixing layer to the average particle size of the primary particle is 0.0052 or more, as the cation-mixing layer is excessively thickened, it is concerned that the electrical characteristic of the lithium-based composite oxide may be degraded.

In addition, the cation-mixing layer may be present on the surface of the secondary particle. Here, it can be confirmed that the ratio (d2/x2) of the thickness (d2) of the cation-mixing layer to the average particle size (x2) of the secondary particle ranges from more than 0.00014 and less than 0.00281.

When the ratio of the thickness of the cation-mixing layer to the average particle size of the secondary particle is 0.00014 or less, the effect of improving the structural stability of the secondary particle by the cation-mixing layer may be insufficient. Meanwhile, when the ratio of the thickness of the cation-mixing layer to the average particle size of the secondary particle is 0.00281 or more, as the cation-mixing layer is excessively thickened, the electrical characteristics of the secondary particle may be degraded.

Meanwhile, the thickness of the cation-mixing layer present on the surface of the secondary particle may be higher than that of the cation-mixing layer present on the surface of the primary particle. In this case, the electrical characteristics of the positive electrode active material can be improved within a range that does not degrade the structural stability of the positive electrode active material consisting of the primary particle and the secondary particle formed by aggregating the primary particles.

Here, the ratio (d1/d2) of the thickness (d1) of the cation-mixing layer present on the surface of the primary particle to the thickness (d2) of the cation-mixing layer present on the surface of the secondary particle preferably ranges from more than 0.53 and less than 1.0.

As such, when there is the cation-mixing layer is present on the surface of each of the primary particle and the secondary particle, the thickness of the cation-mixing layer present on the surface of the secondary particle may be higher than that of the cation-mixing layer present on the surface of the primary particle, thereby minimizing the decrease in electrical characteristics of the positive electrode active material including the primary particle and the secondary particle and improving the structural stability induced by the cation-mixing layer.

Positive electrode active materials according to various embodiments of the present invention may satisfy the ratio (d1/x1) of the thickness (d1) of a cation-mixing layer to the average particle size (x1) of a primary particle in the predetermined range, the ratio (d2/x2) of the thickness (d2) of a cation-mixing layer to the average particle size (x2) of a secondary particle, and the ratio (d1/d2) of the thickness (d1) of a cation-mixing layer present on the surface of a primary particle to the thickness (d2) of a cation-mixing layer present on the surface of a secondary particle, thereby exhibiting improved electrochemical characteristics and structural stability.

Additionally, an Ni occupancy in an Li 3a site obtained from the Rietveld analysis of the X-ray diffraction of the secondary particle may be more than 0.53%, preferably 1.0% or more, and more preferably, 1.3% or more. In addition, the Ni occupancy in the Li 3a site of the secondary particle is preferably less than 6.44%. $Ni^{3+}$ in the 3d site tends to be present as $Ni^{2+}$ thermodynamically stable at high temperatures, and since $Ni^{2+}$ (0.69 Å) has a similar size as $Li^+$ (0.76 Å), the 3a site of Li may be occupied.

Here, as the positive electrode active material according to the present invention has an Ni occupancy in the 3a site of the secondary particle of 0.9% or more, it may be inferred that the cation-mixing layer is effectively present on the surface of the secondary particle.

As described above, the positive electrode active material according to the present invention may be improved in structural stability by the cation-mixing layer, and thus the thermal stability and storage stability of the positive electrode active material may be improved.

In the preparation of a positive electrode for a lithium secondary battery using a positive electrode active material, a slurry including a positive electrode active material is applied on a positive electrode current collector, dried and rolled (pressed). Particularly, it is possible to prepare a positive electrode having a high energy density through rolling under a high-pressure condition. Here, as the rolling density increases, in the case of a positive electrode active material having a smaller particle strength, a particle may collapse, and thus desired electrical characteristics may not be expected. On the other hand, in the case of a positive electrode active material having a high particle strength, even under a high rolling condition, performance may be maintained without the collapse of a particle.

Particularly, when particles collapse under a rolling condition, the ratio of secondary particles included in a relatively smaller particle size distribution range increases, and the positive electrode active material according to the present invention has a variation of particle size distribution before/after 4.5-ton pressing of only 13%, and a variation of particle size distribution before/after 6-ton pressing is only 26%. Accordingly, the positive electrode active material according to the present invention can minimize the collapse of particles and maintain performance under a high rolling condition.

Lithium Secondary Battery

Another aspect of the present invention may provide a positive electrode including a positive electrode current collector and a positive electrode active material layer formed on the positive electrode current collector. Here, the positive electrode active material layer may include, as a positive electrode active material, any one of the lithium composite oxides according to various embodiments of the present invention described above. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder selectively included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer maybe prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

In addition, in another exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support, and then laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same may be provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Particularly, in the case of a pouch-type lithium secondary battery using a positive electrode containing one of positive electrode active materials according to various embodiments of the present invention, as a side reaction between a positive electrode active material and an electrolyte solution is less likely to occur, there are advantages in that stability can be improved and gas generation can be reduced in storage and/or operation.

Accordingly, in lithium secondary batteries using positive electrodes containing positive electrode active materials according to various embodiments of the present invention, for example, after being charged at 0.2 C until 4.25V, the volume increment of a lithium secondary battery may be 0.3 $cm^3$ or less at 60° C. for 14 days, thereby ensuring reliability and stability.

Hereinafter, the present invention will be described in more detail with reference to examples. The examples are merely provided to more fully describe the present invention, and it will not be interpreted that the scope of the present invention is limited to the following examples.

Preparation Example. Preparation of Positive Electrode Active Material

Example 1

A lithium-based composite oxide having a composition of $Li_{1.0}Ni_{0.9}Co_{0.078}Al_{0.022}O_2$ was prepared by measuring $Li_2CO_3$ and LiOH (Li/M ratio=1.05±0.05) as lithium compounds, mixing them with $NiCoAl(OH)_2$ (d(50)=3.0 μm) prepared by co-precipitation, and performing first heat treatment for the resulting mixture at 800° C. for 12 hours.

The lithium-based composite oxide prepared as described above was added to distilled water, and washed at a constant temperature. After dehydration, drying was performed at 150° C. under a vacuum atmosphere. Subsequently, a positive electrode active material was obtained by performing second heat treatment for the dried lithium-based composite oxide at 700° C. for 12 hours.

Example 2

A positive electrode active material was prepared in the same manner as in Example 1, except that a first heat treatment temperature in Example 1 was 850° C.

Example 3

A positive electrode active material was prepared in the same manner as in Example 1, except that a first heat treatment temperature in Example 1 was 900° C.

Example 4

A positive electrode active material was prepared in the same manner as in Example 1, except that a first heat treatment temperature in Example 1 was 730° C.

Example 5

A positive electrode active material was prepared in the same manner as in Example 1, except that a first heat treatment temperature in Example 1 was 750° C.

Example 6

A positive electrode active material was prepared in the same manner as in Example 1, except that 0.25 mol % of a Ba-containing compound $(Ba(OH)_2)$ was additionally mixed before first heat treatment, and the first heat treatment was performed at 770° C.

Example 7

A positive electrode active material was prepared in the same manner as in Example 1, except that that 0.3 mol % of a Ba-containing compound $(Ba(OH)_2)$ was additionally mixed before first heat treatment, and the first heat treatment was performed at 770° C.

Example 8

A positive electrode active material was prepared in the same manner as in Example 1, that 0.4 mol % of a Ba-containing compound $(Ba(OH)_2)$ was additionally mixed before first heat treatment, and the first heat treatment was performed at 770° C.

Example 9

A positive electrode active material was prepared in the same manner as in Example 1, except that 0.3 mol % of an Sr-containing compound $(Sr(OH)_2)$ was additionally mixed before first heat treatment, and the first heat treatment was performed at 770° C.

Example 10

A positive electrode active material was prepared in the same manner as in Example 1, except that 0.05 mol % of a Zr-containing compound $(ZrO_2)$ was additionally mixed before first heat treatment, and the first heat treatment was performed at 770° C.

Example 11

A positive electrode active material was prepared in the same manner as in Example 1, except that 0.1 mol % of a Zr-containing compound ($ZrO_2$) was additionally mixed before first heat treatment, and then the first heat treatment was performed at 770° C.

Example 12

A positive electrode active material was prepared in the same manner as in Example 1, except that 0.2 mol % of a Zr-containing compound ($ZrO_2$) was additionally mixed before first heat treatment, and then the first heat treatment was performed at 770° C.

Example 13

A lithium-based composite oxide having a composition of $Li_{1.0}Ni_{0.9}Co_{0.078}Mn_{0.022}O_2$ was prepared by measuring $Li_2CO_3$, LiOH (Li/M ratio=1.05±0.05) as lithium compounds and 2.0 mol % of KCl, mixing them with NiCoAl$(OH)_2$ (d(50)=3.0 μm) prepared by co-precipitation, and performing first heat treatment for the resulting mixture at 770° C. for 12 hours. The lithium-based composite oxide prepared as described above was added to distilled water, and washed at a constant temperature. After dehydration, drying was performed at 150° C. under a vacuum atmosphere. Subsequently, a positive electrode active material was obtained by performing second heat treatment for the dried lithium-based composite oxide at 700° C. for 12 hours.

Example 14

A positive electrode active material was prepared in the same manner as in Example 1, except that 1.0 mol % of $NH_4H_2PO_4$, instead of 2.0 mol % of KCl, was additionally mixed before first heat treatment, and the first heat treatment was performed at 770° C.

Example 15

A positive electrode active material was prepared in the same manner as in Example 1, except that 2.0 mol % of NaCl, instead of 2.0 mol % of KCl, was additionally mixed before first heat treatment, and the first heat treatment was performed at 770° C.

Comparative Example 1

A positive electrode active material was prepared in the same manner as in Example 1, except that the first heat treatment temperature was 650° C.

Comparative Example 2

A positive electrode active material was prepared in the same manner as in Example 1, except that the first heat treatment temperature was 990° C.

Experimental Example 1. Structural Analysis of Positive Electrode Active Material (1) Analysis of SEM Images of Positive Electrode Active Materials FIGS. 4 to 6 show cross-sectional SEM images of the positive electrode active materials according to Examples 1 and 2 and Comparative Example 1, respectively, showing the results of measuring the grain boundary densities of secondary particles included in the positive electrode active materials, respectively.

Figure 4:
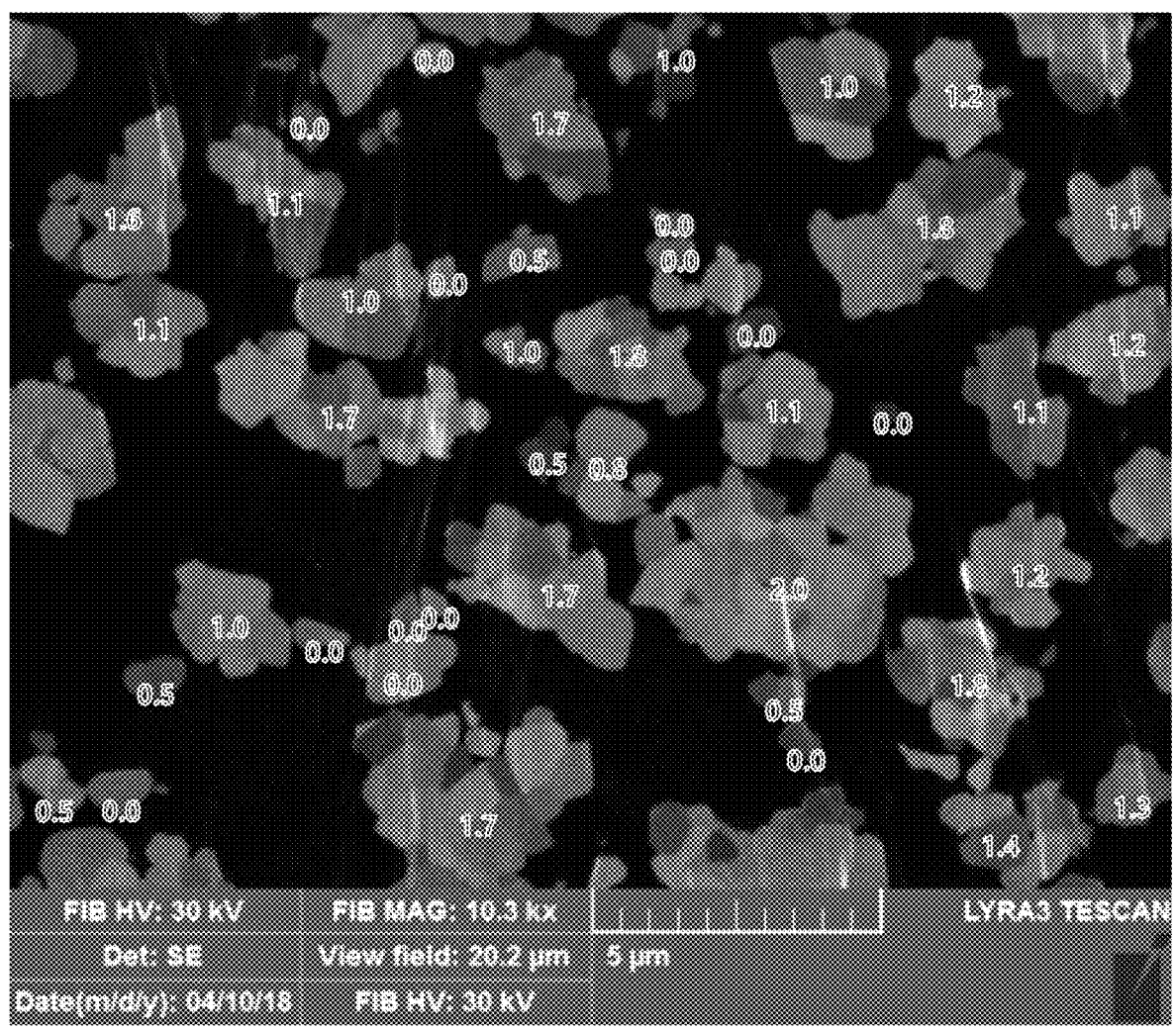
FIGS. 4 and 5 are cross-sectional SEM images of positive electrode active materials according to Examples 1 and 2, respectively, and show the result of measuring a grain boundary density of secondary particles included in each of the positive electrode active materials.
Figure 5:
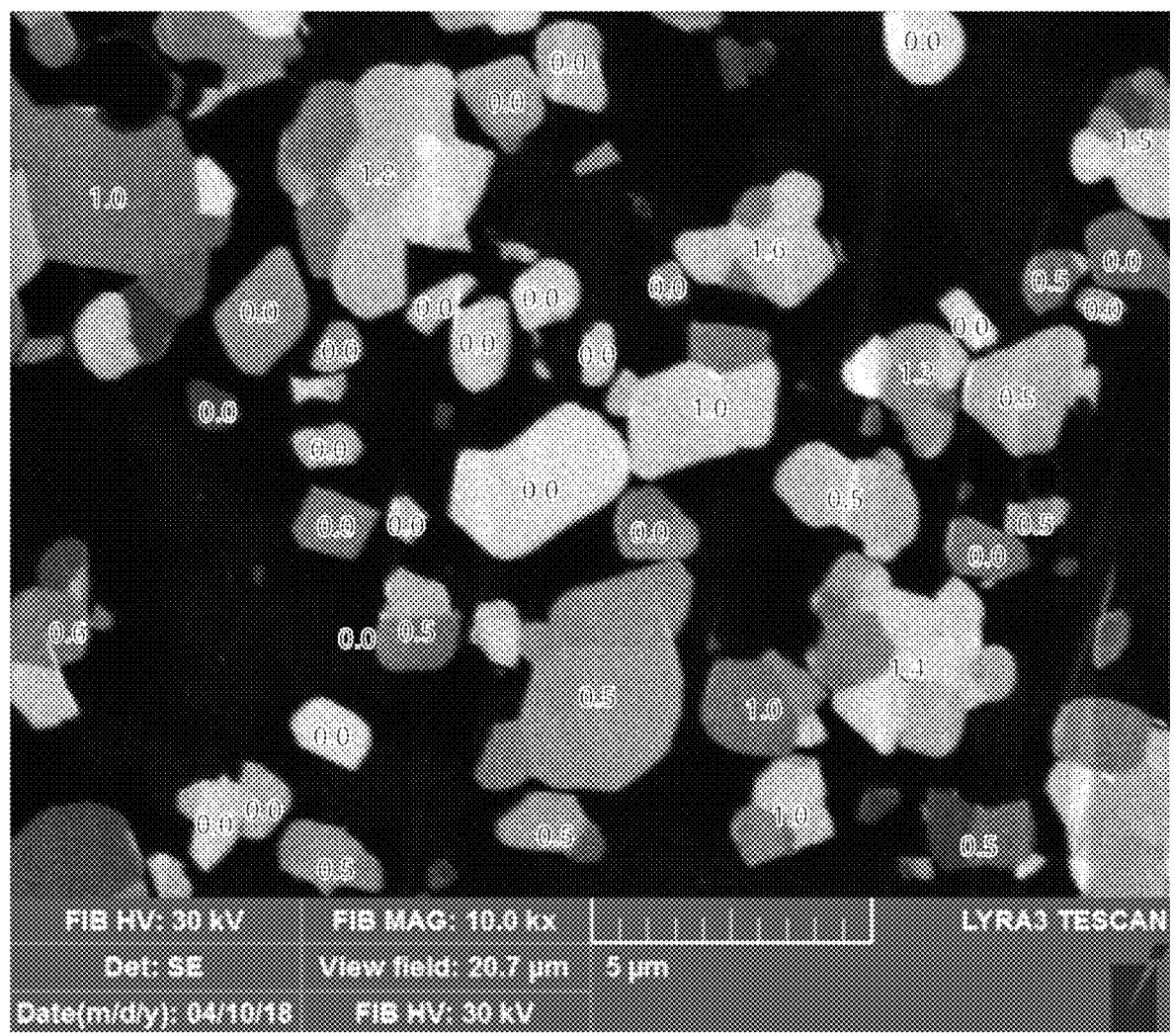
Figure 6:
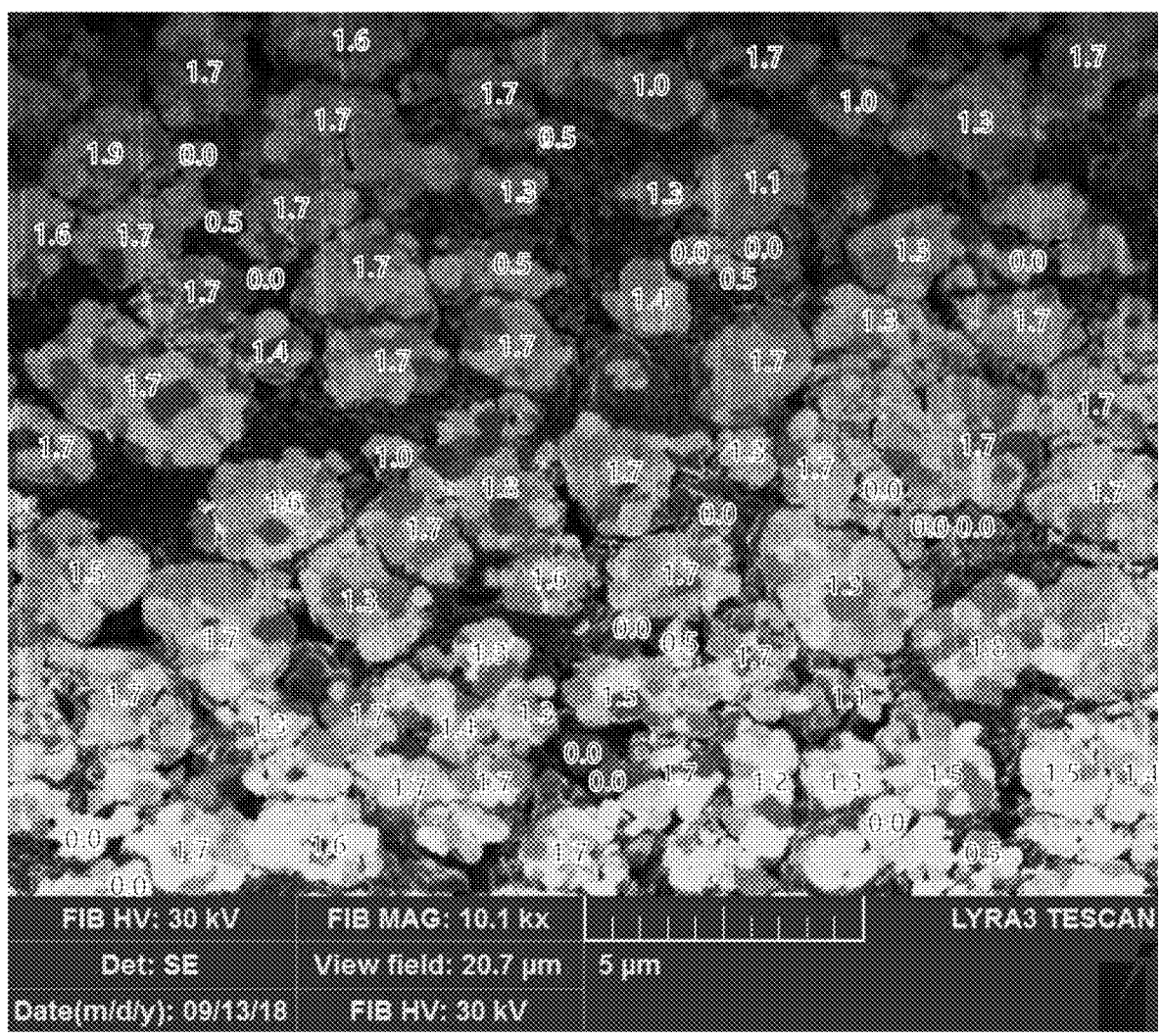
FIG. 6 is a cross-sectional SEM image of a positive electrode active material according to Comparative Example 1, showing the result of measuring a grain boundary density of secondary particles included in the positive electrode active material.
Figure 7:
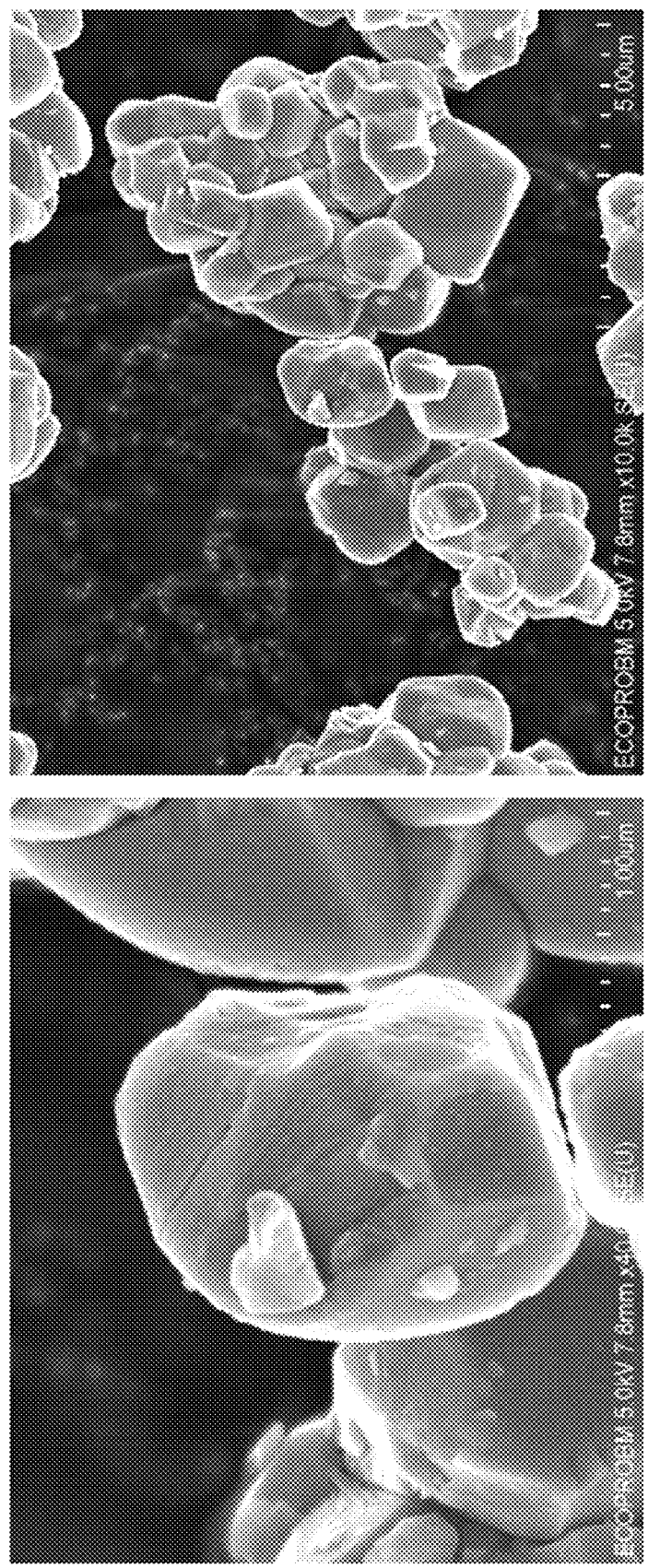
FIGS. 7 to 12 are SEM images of positive electrode active materials according to Examples 1, 3, 4, 5, 7 and 11, respectively.
Figure 8:
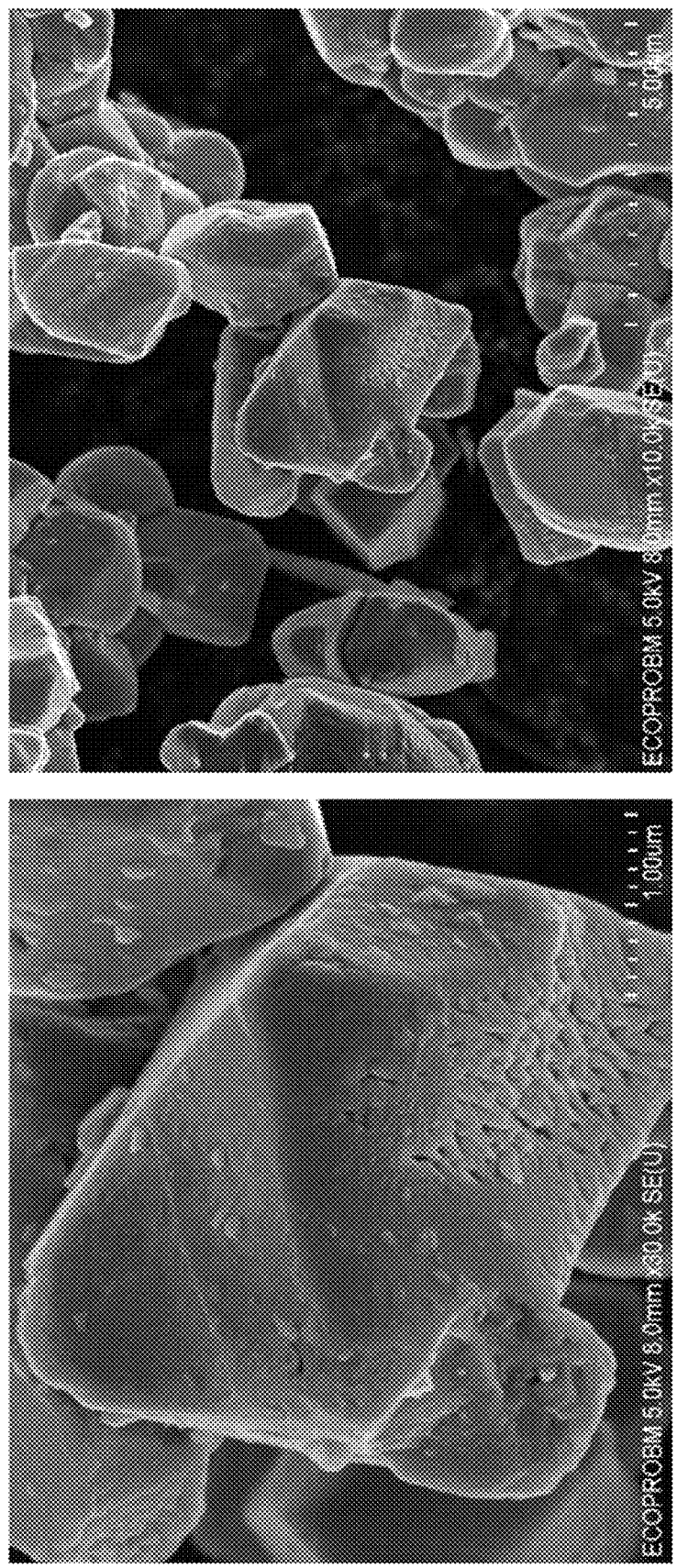
Figure 9:
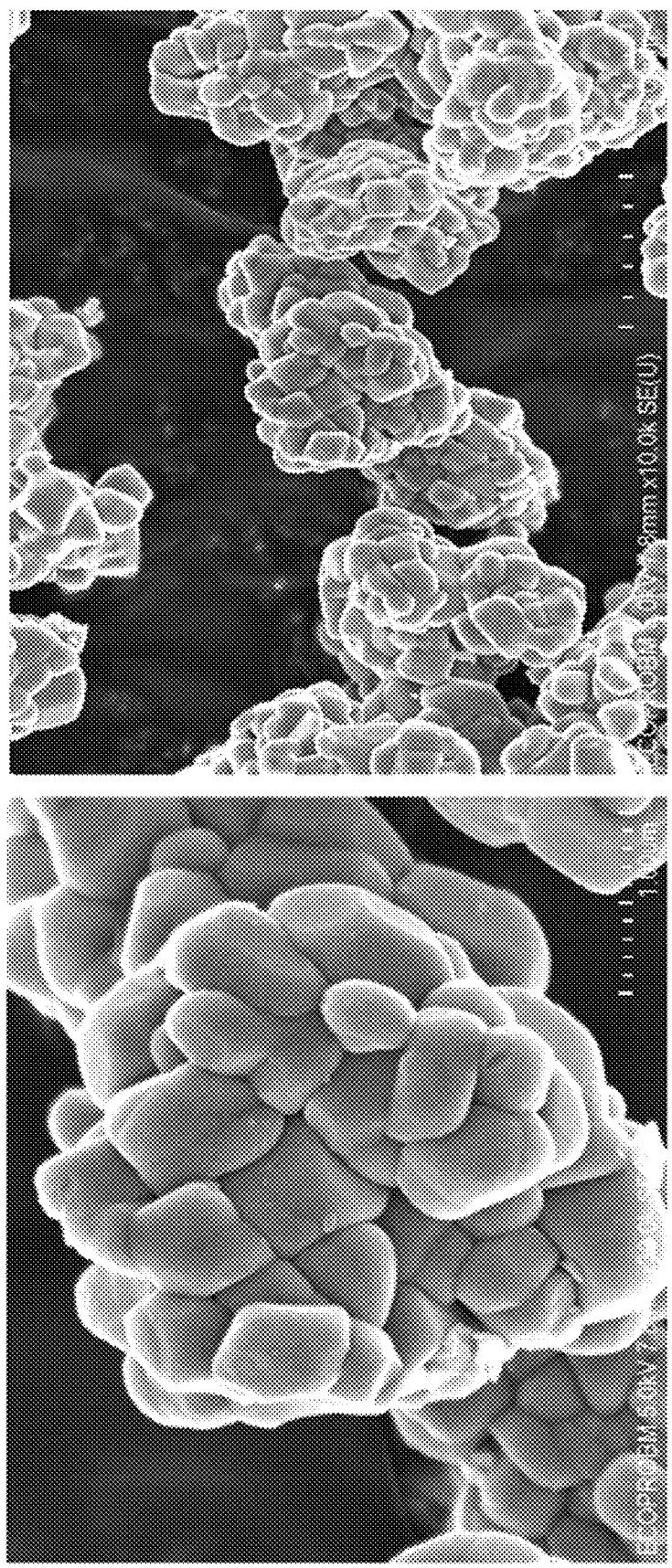
Figure 10:
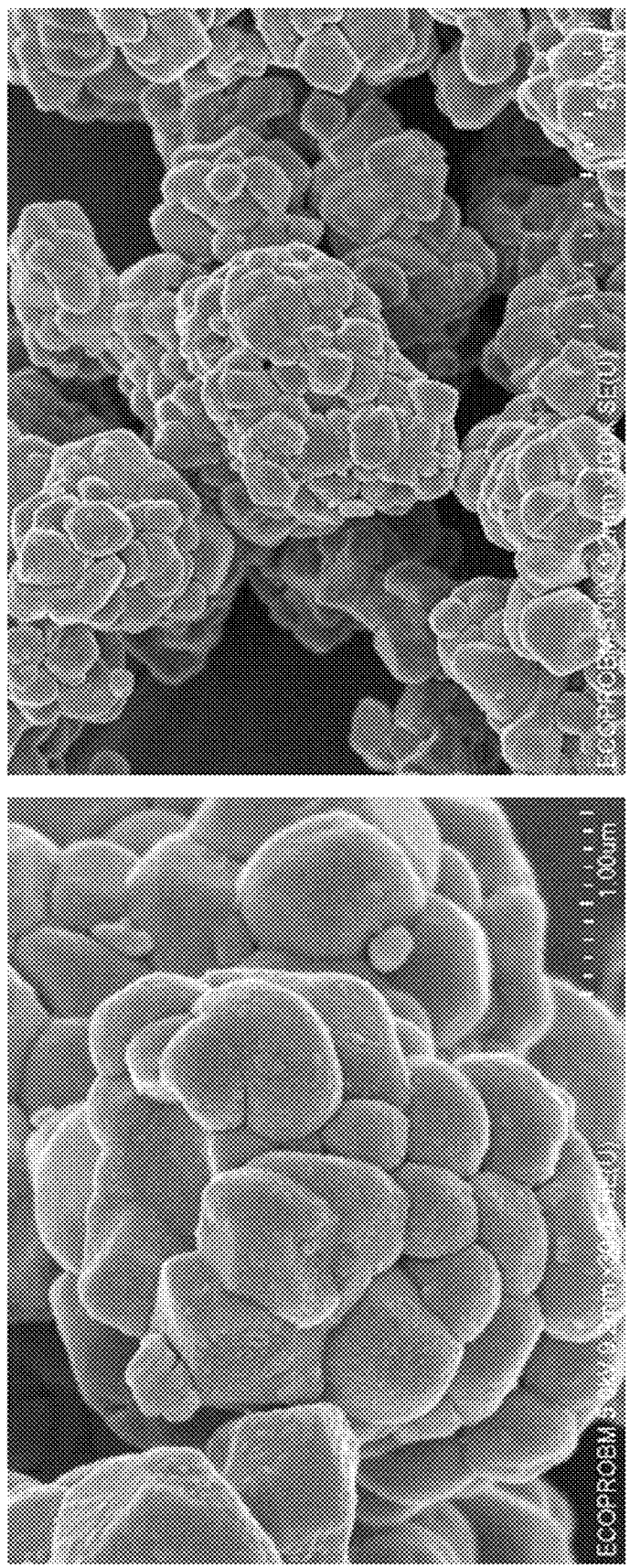

Referring to FIGS. 4 to 6, it can be confirmed that the positive electrode active materials according to Examples 1 and 2 have a higher proportion of secondary particles having a grain boundary density of 0.5 or less, among a plurality of secondary particles constituting a positive electrode active material, compared with the positive electrode active material according to Comparative Example 1.

As such, as the proportion of secondary particles having a grain boundary density of 0.5 or less among a plurality of secondary particles constituting a positive electrode active material may increase, a side reaction with an electrolyte solution at a grain boundary between secondary particles may be reduced, and as the ratio of isotropic lithium ion diffusion paths on the major axis of a secondary particle increases, the lithium ion conductivity and electron conductivity of the positive electrode active material may be improved.

Table 1 below shows the result of measuring the fraction of a grain boundary density of a secondary particle included in a positive electrode active material prepared according to one of the preparation examples.

Figure 11:
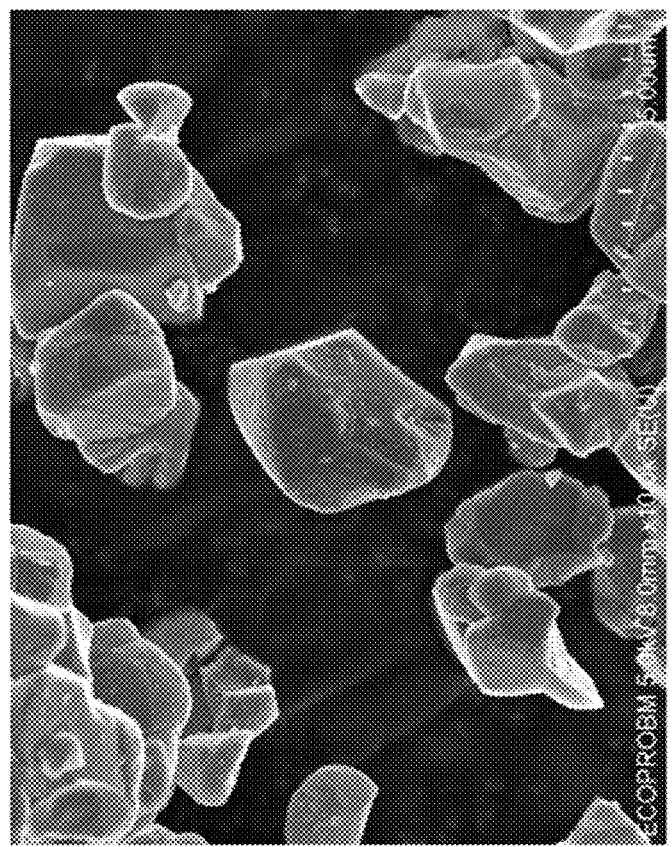
Figure 11:
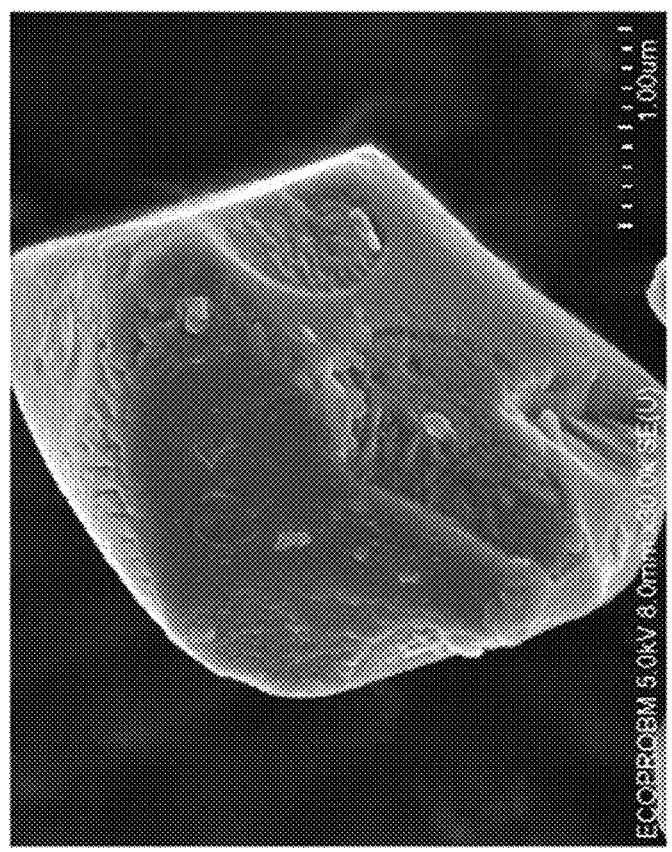
Figure 12:
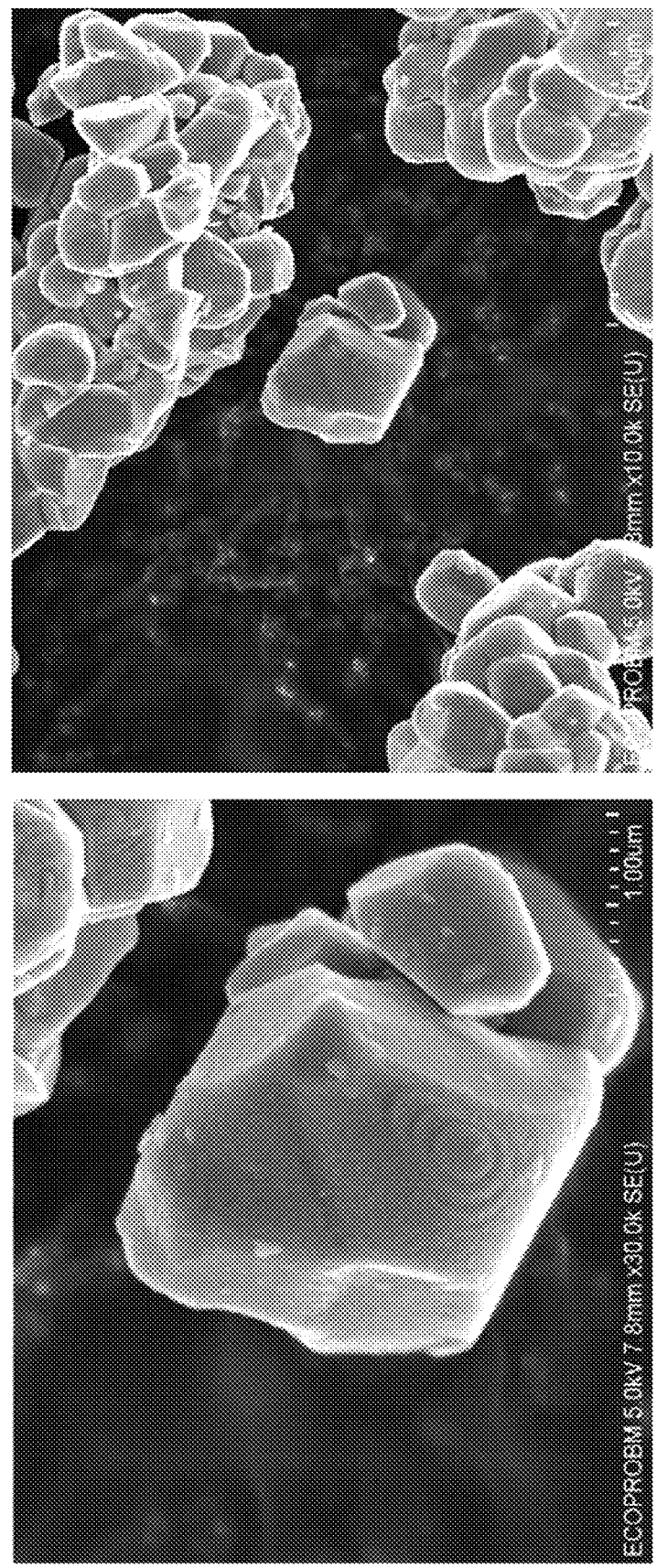
Figure 13:
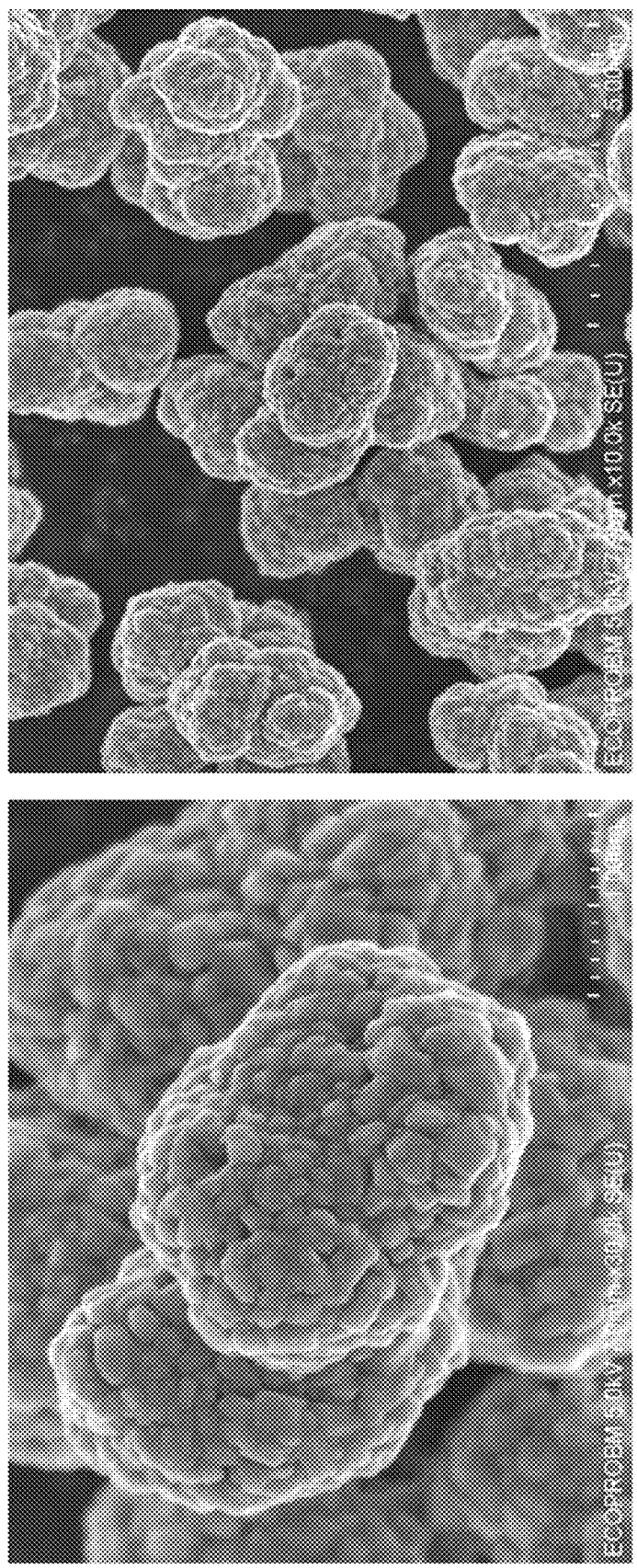
FIGS. 13 and 14 are SEM images of positive electrode active materials according to Comparative Examples 1 and 2, respectively.
Figure 14:
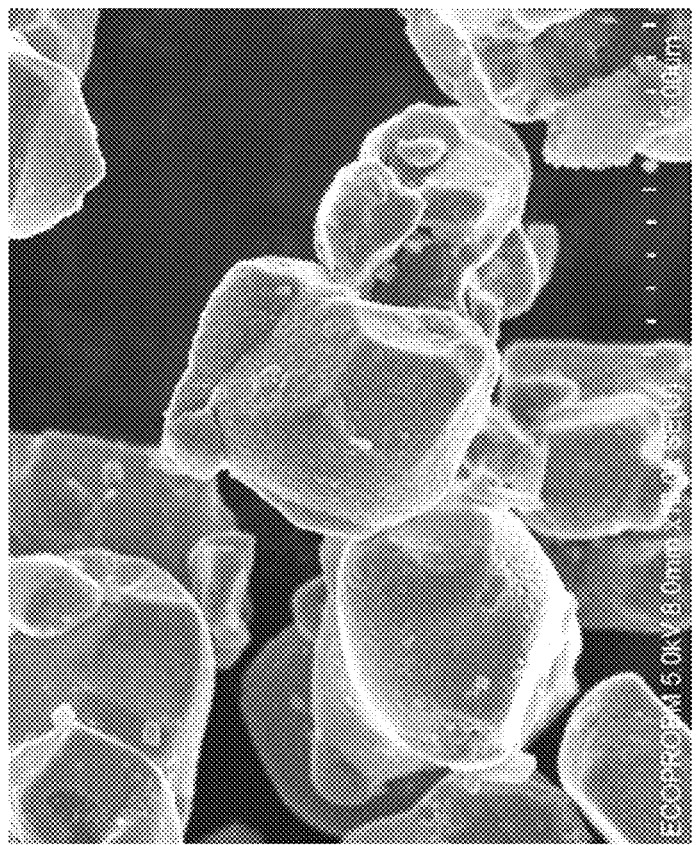
Figure 14:
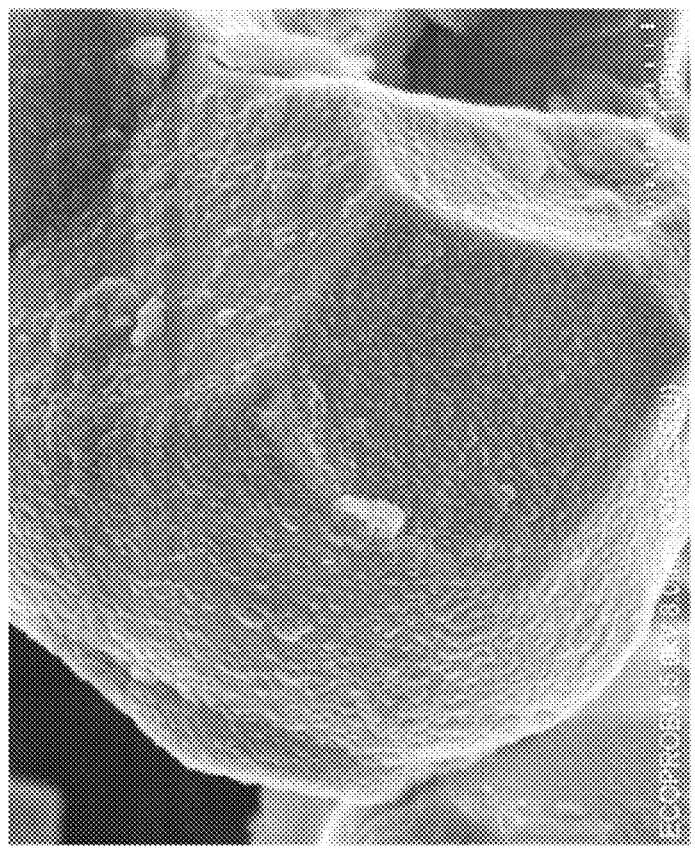
Figure 15:
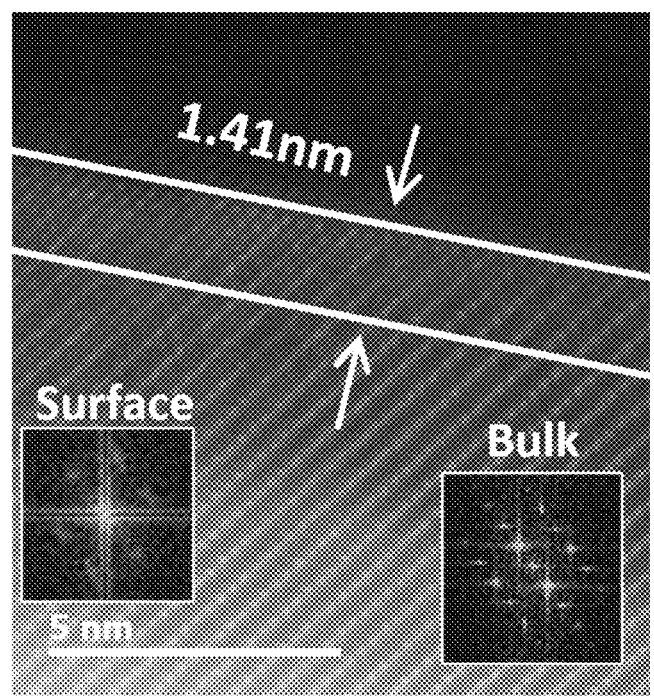
FIGS. 15 to 20 are TEM images of the positive electrode active materials according to Examples 1, 3, 4, 5, 7 and 11, respectively.
Figure 16:
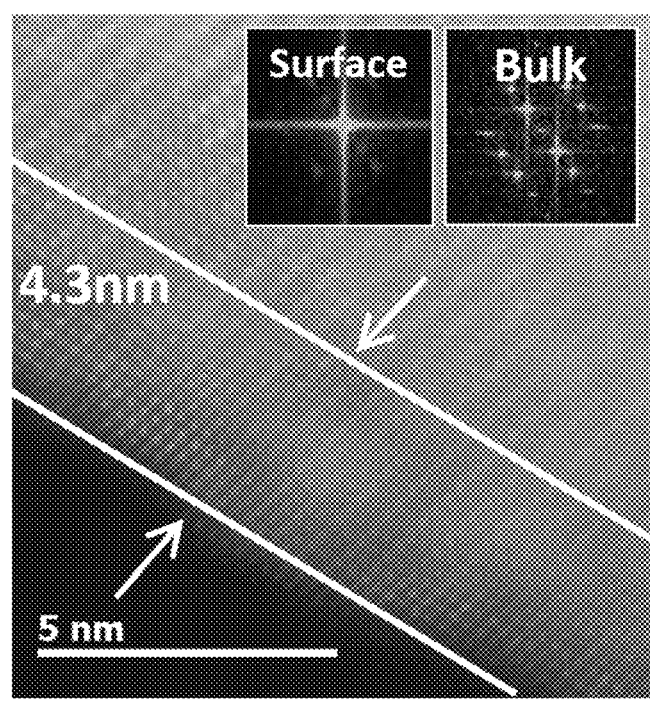
Figure 17:
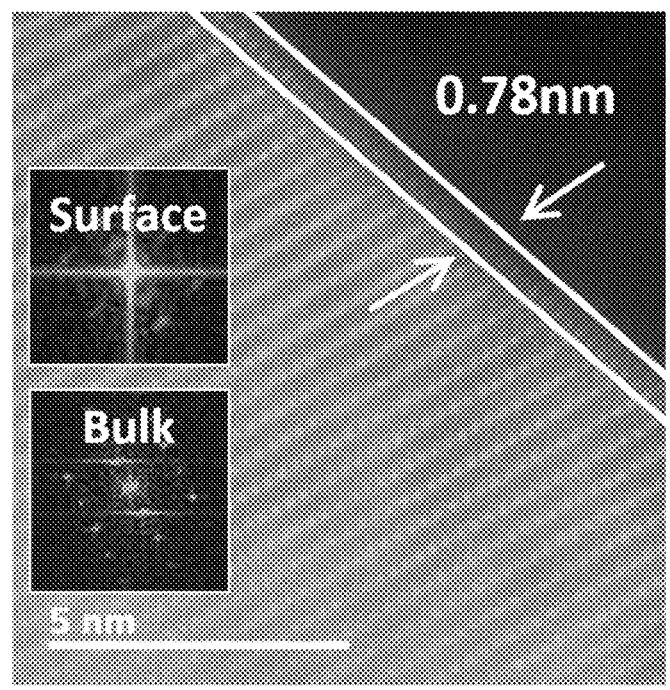
Figure 18:
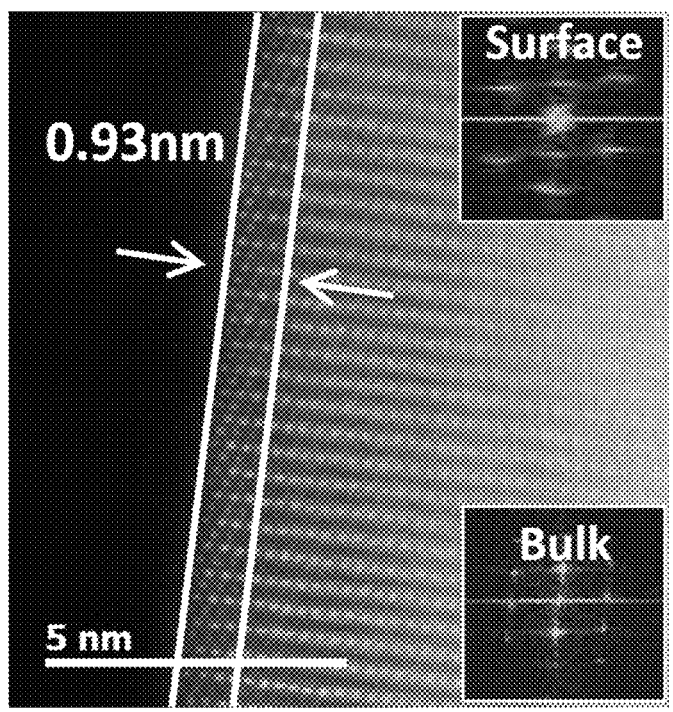

FIGS. 7 to 12 are SEM images of the positive electrode active materials according to Examples 1, 3, 4, 5, 7 and 11, respectively, and FIGS. 13 and 14 are SEM images of the positive electrode active materials according to Comparative Examples 1 and 2, respectively.

First, referring to FIGS. 7 to 10, it can be confirmed that, as a first heat treatment temperature increases, the grain boundary density of a secondary particle is reduced.

TABLE 1

| Classification | Grain boundary density (fraction %) | |
| --- | --- | --- |
| | 0.5 or less | More than 0.5 |
| Example 1 | 71 | 29 |
| Example 2 | 77 | 23 |
| Example 3 | 82 | 18 |
| Example 4 | 46 | 54 |
| Example 5 | 62 | 38 |
| Example 6 | 67 | 33 |
| Example 7 | 72 | 28 |
| Example 8 | 75 | 25 |
| Example 9 | 68 | 32 |
| Example 10 | 66 | 34 |
| Example 11 | 69 | 31 |
| Example 12 | 73 | 27 |
| Example 13 | 70 | 30 |
| Example 14 | 63 | 37 |
| Example 15 | 70 | 30 |
| Comparative Example 1 | 27 | 73 |
| Comparative Example 2 | 84 | 16 |

In addition, referring to FIGS. 11 and 12 showing the SEM images of the positive electrode active materials according to Examples 7 and 11, respectively, although a flux is added in the preparation of a lithium-based composite oxide, the proportion of secondary particles having a grain boundary density of 0.5 or less among the plurality of secondary particles constituting the positive electrode active material is not greatly reduced. In addition, it can be confirmed that, although the first heat treatment temperature (770° C.) in Examples 7 and 11 was lower than that of Example 1 (800° C.), a flux was added to promote particle growth, thereby exhibiting a grain boundary density fraction at a similar level to Example 1.

On the other hand, referring to FIG. 13 showing the SEM image of the positive electrode active material according to Comparative Example 1, unlike the positive electrode active materials according to the Examples, it can be confirmed that the positive electrode active material includes secondary particles having a relatively higher grain boundary density. Meanwhile, referring to FIG. 14, the positive electrode active material according to Comparative Example 2 includes secondary particles exhibiting a grain boundary density at a similar level to those of the Examples.

(2) Analysis of TEM Images of Positive Electrode Active Materials

Figure 19:
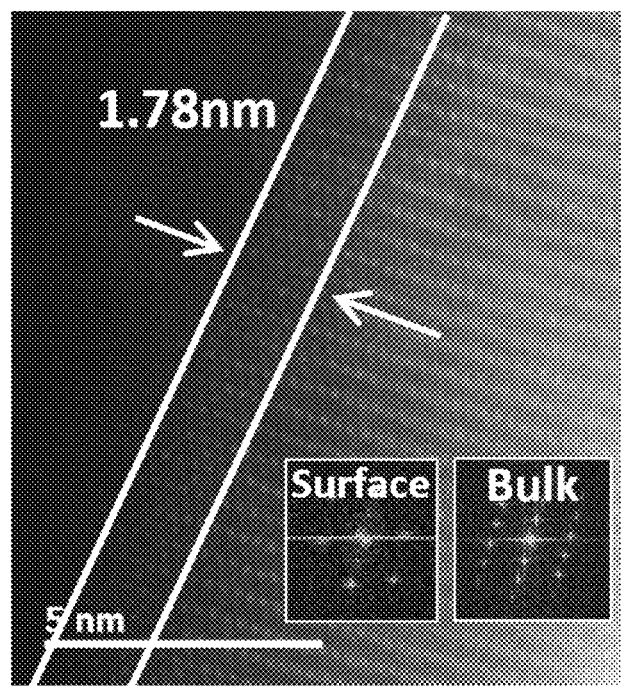
Figure 20:
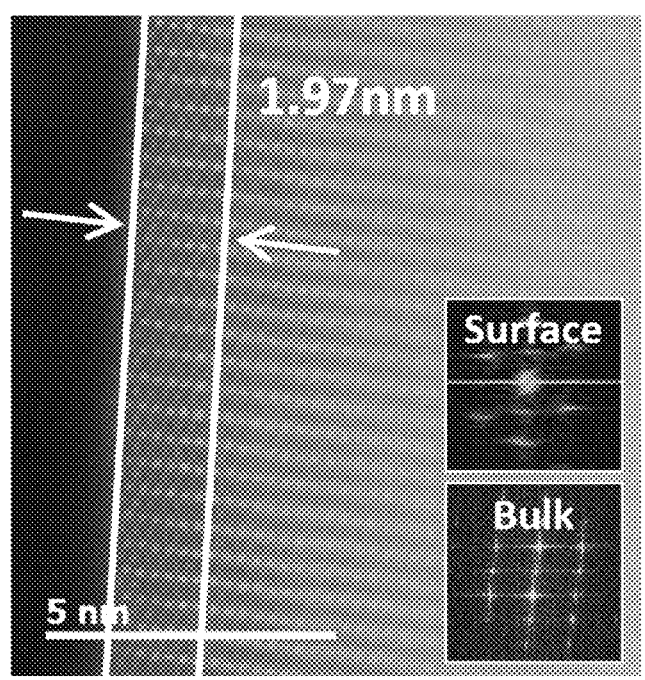
Figure 21:
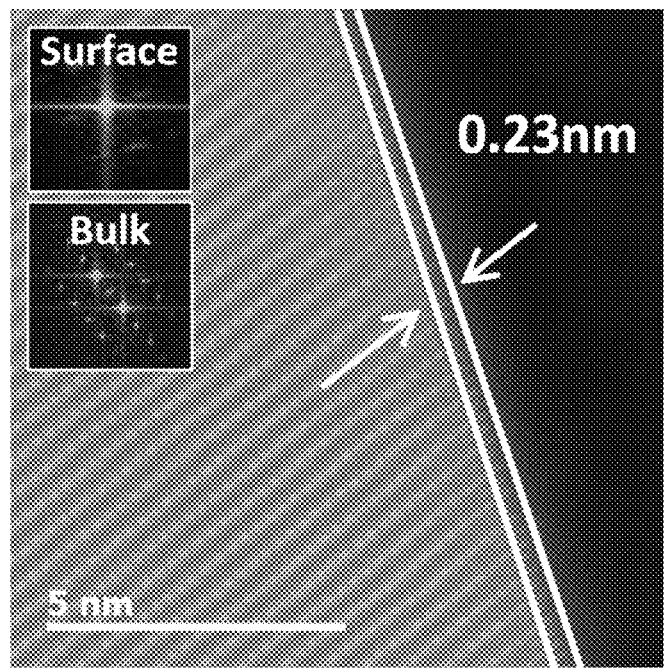
FIGS. 21 and 22 are TEM images of the positive electrode active materials of Comparative Examples 1 and 2, respectively.
Figure 22:
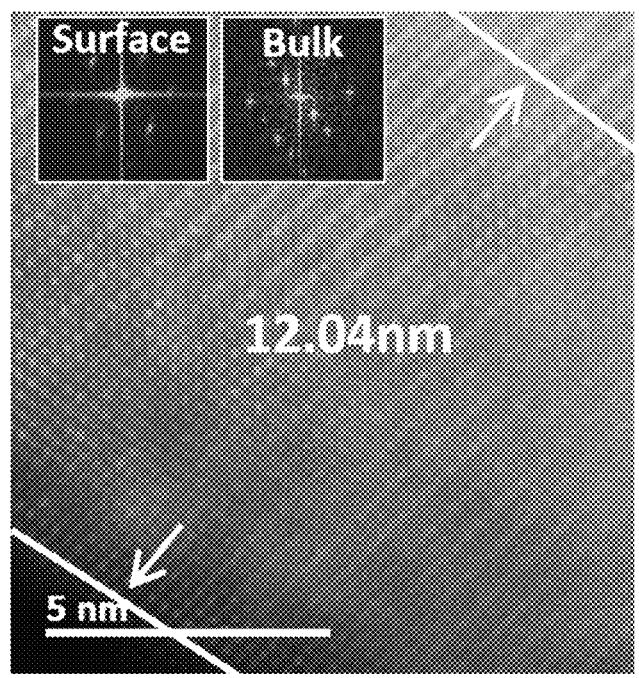

FIGS. 15 to 20 are TEM images of the positive electrode active materials according to Examples 1, 3, 4, 5, 7 and 11, respectively, and FIGS. 21 and 22 are TEM images of the positive electrode active materials according to Comparative Examples 1 and 2, respectively.

Referring to FIGS. 15 to 18, it can be confirmed that the cation-mixing layer (rocksalt structure) has a crystal structure different from a bulk (layered structure) part. In addition, it may be confirmed that, among the plurality of secondary particles constituting the positive electrode active material, as a ratio of the secondary particles having a grain boundary density of 0.5 or less is increased, the thickness of the cation-mixing layer tends to also be increased.

In addition, referring to FIGS. 19 and 20 showing the TEM images of the positive electrode active materials according to Examples 7 and 11, respectively, it can be confirmed that, although a first heat treatment temperature is lower than that of Example 1, the thickness of a cation-mixing layer is even increased by adding a flux in the preparation of a lithium-based composite oxide.

On the other hand, referring to FIG. 20 showing the TEM image of the positive electrode active material according to Comparative Example 1, unlike the positive electrode active materials according to the examples, it can be confirmed that the measured thickness of the cation-mixing layer is excessively small. Meanwhile, referring to FIG. 22, in the case of the positive electrode active material according to Comparative Example 2, it can be confirmed that an excessively thick cation-mixing layer is formed thereon. As such, it is apprehended that the excessively thick cation-mixing layer rather reduces the electrical characteristics of the positive electrode active material.

In Table 2 below, the average particle sizes of the primary and secondary particles included in the positive electrode active materials prepared according to the preparation examples, and ratios of the thicknesses of the cation-mixing layers formed on the surfaces of the primary and secondary particles relative to the average particle sizes of the primary and secondary particles are shown.

TABLE 2

| Classification | x1 (μm) | d1 (μm) | d1/x1 | x2 (μm) | d2 (μm) | d2/x2 | d1/d2 |
|---|---|---|---|---|---|---|---|
| Example 1 | 0.8 | 0.00141 | 0.0018 | 4.3 | 0.00164 | 0.00038 | 0.86 |
| Example 2 | 0.9 | 0.00180 | 0.0020 | 4.5 | 0.00210 | 0.00047 | 0.86 |
| Example 3 | 2.0 | 0.00430 | 0.0022 | 4.7 | 0.00451 | 0.00096 | 0.95 |
| Example 4 | 0.5 | 0.00078 | 0.0016 | 3.5 | 0.00096 | 0.00027 | 0.81 |
| Example 5 | 0.6 | 0.00093 | 0.0016 | 3.7 | 0.00112 | 0.00030 | 0.83 |
| Example 6 | 0.8 | 0.00152 | 0.0019 | 4.1 | 0.00171 | 0.00042 | 0.89 |
| Example 7 | 0.9 | 0.00178 | 0.0020 | 4.3 | 0.00198 | 0.00046 | 0.90 |
| Example 8 | 1.0 | 0.00220 | 0.0022 | 4.4 | 0.00241 | 0.00055 | 0.91 |
| Example 9 | 1.0 | 0.00240 | 0.0024 | 4.2 | 0.00271 | 0.00065 | 0.89 |
| Example 10 | 0.9 | 0.00144 | 0.0016 | 4.2 | 0.00163 | 0.00039 | 0.88 |
| Example 11 | 1 | 0.00197 | 0.0020 | 4.4 | 0.00218 | 0.00050 | 0.90 |
| Example 12 | 1.1 | 0.00243 | 0.0022 | 4.5 | 0.00267 | 0.00059 | 0.91 |
| Example 13 | 1.1 | 0.00520 | 0.0047 | 4.3 | 0.00570 | 0.00133 | 0.91 |
| Example 14 | 1.2 | 0.00304 | 0.0025 | 4.3 | 0.00323 | 0.00075 | 0.94 |
| Example 15 | 1.4 | 0.00615 | 0.0044 | 4.2 | 0.00634 | 0.00151 | 0.97 |
| Comparative Example 1 | 0.3 | 0.00023 | 0.0008 | 3.1 | 0.00043 | 0.00014 | 0.53 |
| Comparative Example 2 | 2.3 | 0.01204 | 0.0052 | 4.3 | 0.01208 | 0.00281 | 1.00 | x1 : Average particle size of primary particles
d1 : Thickness of cation-mixing layer present on the surface of primary particle
x2 : Average particle size of secondary particles
d2 : Thickness of cation-mixing layer present on the surface of secondary particle Referring to Table 2, it can be confirmed that, in the positive electrode active materials according to Examples 1 to 15, a ratio (d1/x1) of the thickness (d1) of a cation-mixing layer to the average particle size (x1) of primary particles ranges from more than 0.0008 and less than 0.0052, and a ratio (d2/x2) of the thickness (d2) of a cation-mixing layer to the average particle size (x2) of secondary particles ranges from more than 0.00014 and less than 0.00281. It can also be confirmed that a ratio (d1/d2) of the thickness (d1) of a cation-mixing layer present on the surface of a primary particle to the thickness (d2) of a cation-mixing layer present on the surface of a secondary particle ranges from more than 0.53 and less than 1.0.

The positive electrode active materials according to the examples of the present invention may exhibit an improved electrochemical characteristics and stability to be described below by satisfying the ratio (d1/x1) of the thickness (d1) of a cation-mixing layer to the average particle size (x1) of primary particles, the ratio (d2/x2) of the thickness (d2) of a cation-mixing layer to the average particle size (x2) of secondary particles, and ratio (d1/d2) of the thickness (d1) of a cation-mixing layer present on the surface of a primary particle to the thickness (d2) of a cation-mixing layer present on the surface of a secondary particle within the above-mentioned ranges.

In addition, comparing the positive electrode active materials according to Examples 1 and 6 to 15, it may be confirmed that the positive electrode active materials according to Examples 6 to 15 using a flux in the preparation of a positive electrode active material are increased in ratio (d1/x1) of the thickness (d1) of a cation-mixing layer to the average particle size (x1) of primary particles and ratio (d2/x2) of the thickness (d2) of a cation-mixing layer to the average particle size (x2) of secondary particles, compared with Example 1 not using a flux.

(3) XRD Analysis for Positive Electrode Active Material

Through XRD analysis for the positive electrode active materials prepared according to the preparation examples, Ni occupancies inserted into an Li 3a site ($Ni^{Li}$ occupancy) of the positive electrode active materials were measured from the Rietveld analysis of the X-ray diffraction positive electrode active material.

As an X-ray source used in the XRD analysis, Cu-Kα radiation ($\lambda$=1.5406 Å) was used, and the measurement was performed at a scanning interval of 0.01°/min in a range from 10 to 120° (2θ) by a θ-2θ scan (Bragg-Brentano parafocusing geometry) method. The measurement results are shown in Table 3 below.

TABLE 3

| Classification | Ni Occ. (%) |
|---|---|
| Example 1 | 1.36 |
| Example 2 | 2.46 |
| Example 3 | 4.3 |
| Example 4 | 0.94 |
| Example 5 | 1.07 |
| Example 6 | 1.23 |
| Example 7 | 1.38 |
| Example 8 | 1.41 |
| Example 9 | 1.37 |
| Example 10 | 1.11 |
| Example 11 | 1.35 |
| Example 12 | 1.54 |
| Example 13 | 2.76 |
| Example 14 | 2.11 |
| Example 15 | 2.48 |
| Comparative Example 1 | 0.53 |
| Comparative Example 2 | 6.44 |

Referring to Table 3, it can be confirmed that the $Ni^{Li}$ occupancies of the positive electrode active materials have a similar tendency to the thicknesses (d1 and d2) of the cation-mixing layers shown in Table 2.

The $Ni^{Li}$ occupancies of the positive electrode active materials according to Examples 1 to 15 are within a range of more than 0.53% and less than 6.44%, and the positive electrode active materials according to various examples of the present invention may include a cation-mixing layer having an appropriate thickness, formed on the surfaces of primary and secondary particles constituting the positive electrode active material, and also show $Ni^{Li}$ occupancies at an appropriate level, thereby improving electrochemical characteristics and structural stability, which will be described below, compared with the comparative example.

Experimental Example 2. Measurement of Electrochemical Characteristics of Positive Electrode Active Material (1) Manufacture of Lithium Secondary Battery When a lithium secondary battery is manufactured using each of the positive electrode active materials according to the examples of the present invention, To confirm whether to exhibit the same or similar level of electrochemical characteristics compared with a conventional positive electrode active material, this experimental example provided lithium secondary batteries to which positive electrodes prepared using positive electrode active materials according to the examples and comparative examples were applied.

A slurry was prepared by mixing one of the positive electrode active materials prepared as described above, super-P as a conductive material and polyvinylidenefluoride (PVdF) as a binder in a weight ratio of 92:4:4. A positive electrode for a lithium secondary battery was prepared by uniformly applying the slurry to a 15-μm thick aluminum film and vacuum drying it at 135° C.

A coin battery used the positive electrode, a lithium foil as a counter electrode and a porous polyethylene film (Celgard 2300, thickness: 25 μm) as a separator, and was prepared according to a conventionally known manufacturing process using a liquid electrolyte solution in which $LiPF_6$ was dissolved in a solvent in which ethylene carbonate and ethylmethylcarbonate are mixed in a volume ratio of 3:7 at a concentration of 1.15M.

(2) Evaluation of Battery Capacity and Lifetime Characteristics of Lithium Secondary Battery The lithium secondary battery manufactured by the above-described method was subjected to a charging/discharging test using an electrochemical analyzer (Toyo, Toscat-3100) at 25° C. by applying a voltage range of 3.0 to 4.25 V and a discharging rate of 0.5 to 4.0 C, thereby manufacturing an initial charge capacity, initial discharge capacity, an initial reversible efficiency and a rate characteristic.

In addition, the lithium secondary battery manufactured by the method described above was subjected to 50 cycles of charging/discharging at 25° C. in a driving voltage range of 3.0 to 4.25 V under a condition of 1 C/1 C, followed by measuring a ratio of the discharge capacity at the $50^{th}$ cycle with respect to the initial capacity (cycle capacity retention).

The measured battery capacity and lifetime characteristics are shown in Tables 4 and 5 below.

TABLE 4

| Classification | Initial charge capacity (mAh/g) | Initial discharge capacity (mAh/g) | Initial reversible efficiency (%) |
|---|---|---|---|
| Example 1 | 235.2 | 209.6 | 89.1 |
| Example 2 | 235.0 | 205.2 | 87.3 |
| Example 3 | 229.9 | 192.7 | 83.8 |
| Example 4 | 235.5 | 219.5 | 93.2 |
| Example 5 | 235.0 | 214.8 | 91.4 |
| Example 6 | 235.1 | 211.2 | 89.8 |
| Example 7 | 235.3 | 209.9 | 89.2 |
| Example 8 | 235.3 | 207.9 | 88.4 |
| Example 9 | 235.0 | 208.1 | 88.6 |
| Example 10 | 235.2 | 211.9 | 90.1 |
| Example 11 | 235.1 | 209.5 | 89.1 |
| Example 12 | 235.0 | 207.1 | 88.1 |
| Example 13 | 231.1 | 199.4 | 86.3 |
| Example 14 | 234.6 | 211.2 | 90.0 |
| Example 15 | 230.4 | 200.7 | 87.1 |
| Comparative Example 1 | 233.9 | 212.8 | 91.0 |
| Comparative Example 2 | 228.6 | 178.5 | 78.1 |

TABLE 5

| Classification | Rate characteristic (%) | | | | | Lifetime characteristic (%) |
|---|---|---|---|---|---|---|
| | 0.5 C | 1.0 C | 2.0 C | 3.0 C | 4.0 C | 50 cy |
| Example 1 | 96.8 | 94.5 | 92.2 | 90.8 | 89.9 | 87.7 |
| Example 2 | 96.5 | 94.4 | 92.0 | 90.1 | 89.6 | 88.2 |
| Example 3 | 96.5 | 94.5 | 92.1 | 90.3 | 89.6 | 89.9 |
| Example 4 | 96.1 | 94.1 | 91.8 | 89.9 | 89.0 | 73.3 |
| Example 5 | 96.3 | 94.2 | 92.0 | 90.1 | 89.8 | 84.1 |
| Example 6 | 96.4 | 94.3 | 92.0 | 90.1 | 89.8 | 86.5 |
| Example 7 | 96.9 | 94.8 | 92.4 | 90.7 | 90.0 | 90.8 |
| Example 8 | 96.5 | 94.2 | 92.1 | 91.0 | 89.9 | 90.7 |
| Example 9 | 95.8 | 93.2 | 91.0 | 89.2 | 87.7 | 85.6 |
| Example 10 | 96.1 | 94.1 | 91.8 | 89.9 | 89.0 | 85.9 |
| Example 11 | 96.8 | 94.8 | 92.3 | 90.5 | 89.8 | 89.7 |
| Example 12 | 96.7 | 94.6 | 92.0 | 90.4 | 89.5 | 88 |
| Example 13 | 95.8 | 92.9 | 91.1 | 89.0 | 87.7 | 82.7 |
| Example 14 | 96.0 | 93.5 | 92.0 | 89.6 | 88.0 | 85.3 |
| Example 15 | 95.8 | 92.8 | 91.0 | 89.2 | 87.8 | 82.4 |
| Comparative Example 1 | 95.9 | 93.1 | 91.4 | 89.2 | 87.8 | 70.1 |
| Comparative Example2 | 96.0 | 93.2 | 91.7 | 89.3 | 87.9 | 85.1 |

Referring to Table 4, it can be confirmed that, when the positive electrode active materials according to Examples 1 to 15 are used, the initial capacity and reversible efficiency are in relatively excellent levels. In addition, comparing the case in which the positive electrode active materials according to Examples 1 and 7 are used, in the preparation of a positive electrode active material, it can be confirmed that the positive electrode active material according to Example 7 using a flux, compared with Example 1 not using a flux, is slightly improved in initial capacity and reversible capacity.

Meanwhile, it can be confirmed that the positive electrode active material according to Comparative Example 2 have the lowest initial reversible efficiency than other examples and comparative examples, and therefore is not suitable for the application as a positive electrode active material for a lithium secondary battery in practice.

In addition, referring to Table 5, when the positive electrode active materials according to the examples are used, compared with the comparative examples, as a result of charge/discharge experiments to which a discharge rate of 0.5 to 4.0 C is applied, it can be confirmed that a rate characteristic and a lifetime characteristic are high overall. In addition, comparing the cases using the positive electrode active materials according to Examples 1 and 7, it can be confirmed that, in the preparation of a positive electrode active material, the positive electrode active material according to Example 7 using a flux, compared with Example 1 not using a flux, lifetime characteristics are further improved.

Meanwhile, it can be confirmed that the positive electrode active material according to Comparative Example 1 has the lowest lifetime characteristic, compared with examples and comparative examples having different lifetime characteristics, is not suitable for application as a positive electrode active material for a lithium secondary battery in practice.

Experimental Example 3. Evaluation of Stability of Positive Electrode Active Material and Secondary Battery (1) Evaluation of Thermal Stability To evaluate the thermal stability of the positive electrode active materials according to the examples and comparative examples, a weight loss was measured using a thermogravimetric analyzer (TA Instruments, Q20) under a normal pressure Ar atmosphere at temperature from 25 to 350° C. at a heating rate of 10° C./min. The measurement results are shown in Table 6 below.

In Table 6 below, as a result of TGA analysis, a starting temperature (on-set) refers to a starting temperature at which a weight loss (pyrolysis) peak of a positive electrode active material, and the maximum temperature (peak) refers to a temperature at the peak of the weight loss (pyrolysis).

It can be confirmed that the positive electrode active materials according to the examples, except Example 4, 5 and 15, show weight loss peaks at approximately 230° C. or more, whereas the positive electrode active materials according to Comparative Examples 1 and 2 show weight loss peaks at a temperature of approximately 225° C. or less. Here, since the positive electrode active materials according to Examples 4, 5 and 15 show weight loss peaks at approximately 225° C. or more, compared with the positive electrode active materials according to Comparative Examples 1 and 2, it can be confirmed that high-temperature stability is relatively high.

Meanwhile, since the positive electrode active materials according to Examples 1 to 15 show the highest weight loss peak at higher temperatures than those according to Comparative Examples 1 and 2, confirming that they have relatively greater high-temperature stability.

TABLE 6

| Classification | Starting temperature (° C.) | Maximum temperature (° C.) |
|---|---|---|
| Example 1 | 233.6 | 241.6 |
| Example 2 | 233.2 | 242.7 |
| Example 3 | 238.3 | 246.1 |
| Example 4 | 226.1 | 235.2 |
| Example 5 | 228.4 | 234.4 |
| Example 6 | 230.2 | 236.5 |
| Example 7 | 237.3 | 245.7 |
| Example 8 | 237.1 | 244.3 |
| Example 9 | 232.6 | 236.0 |
| Example 10 | 231.1 | 238.4 |
| Example 11 | 236.2 | 244.1 |
| Example 12 | 237 | 245.2 |
| Example 13 | 228.7 | 233.8 |
| Example 14 | 230.3 | 237.8 |
| Example 15 | 227.1 | 235.4 |
| Comparative Example 1 | 222.2 | 230.9 |
| Comparative Example 2 | 224.9 | 232.0 |

(2) Manufacture of Lithium Secondary Battery

When lithium secondary batteries were manufactured using the positive electrode active materials according to the examples and comparative examples of the present invention, to confirm whether to exhibit electrochemical characteristics the same or similar to the conventional positive electrode active material, in this experiment, lithium secondary batteries to which the positive electrodes prepared using the positive electrode active materials according to the examples and comparative examples were applied were obtained.

Specifically, a slurry was prepared by mixing one of the prepared positive electrode active material, super-P as a conductive material and polyvinylidenefluoride (PVdF) as a binder at a weight ratio of 92:4:4. A positive electrode for a lithium secondary battery was prepared by uniformly applying the slurry to a 15-μm thick aluminum film and vacuum drying it at 135° C.

A coin battery used the positive electrode, a lithium foil as a counter electrode and a porous polyethylene film (Celgard 2300, thickness: 25 μm) as a separator, and was prepared according to a conventionally known manufacturing process using a liquid electrolyte solution in which $LiPF_6$ was dissolved in a solvent in which ethylene carbonate and ethylmethylcarbonate are mixed in a volume ratio of 3:7 at a concentration of 1.15M.

(3) Measurement of Gas Generation Amount of Lithium Secondary Battery

A volume change of the lithium secondary battery caused by gas generation in the lithium secondary battery was measured by charging the lithium secondary battery manufactured by the above-described method with constant current of 0.2 C until 4.25V, and storing it at 60° C. for 14 days. The volume change measurement results are shown in Table 7 below.

TABLE 7

| Classification | Gas generation amount ($\Delta cm^3$) |
|---|---|
| Example 1 | 0.027 |
| Example 2 | 0.025 |
| Example 3 | 0.018 |
| Example 4 | 0.071 |
| Example 5 | 0.033 |

TABLE 7-continued

| Classification | Gas generation amount (Δcm³) |
|---|---|
| Example 6 | 0.029 |
| Example 7 | 0.019 |
| Example 8 | 0.018 |
| Example 9 | 0.03 |
| Example 10 | 0.029 |
| Example 11 | 0.020 |
| Example 12 | 0.017 |
| Example 13 | 0.045 |
| Example 14 | 0.044 |
| Example 15 | 0.029 |
| Comparative Example 1 | 0.108 |
| Comparative Example 2 | 0.017 |

Referring to Table 7, in the lithium secondary batteries using the positive electrode active materials according to Examples 1 to 15 and Comparative Example 2, compared with the lithium secondary battery using the positive electrode active material according to Comparative Example 1, it can be confirmed that a gas generation amount is reduced.

When an overcurrent above the limit flows in a lithium secondary battery, as the inner temperature of the battery rapidly increases, the decomposition reaction of an electrolyte solution may be caused, thereby generating a gas. However, in this experimental example, since it is not the condition in which an overcurrent does not flow through the lithium secondary battery, it may be expected that gas is generated by side reactions at the interface between the electrolyte solution and the positive electrode active material and the surfaces thereof.

Considering the results shown in Table 7, it can be confirmed that the thermal stability and storage stability caused by the structural stability of the positive electrode active materials according to Examples 1 to 15 are similar or superior to those of the conventional positive electrode active materials.

The surface and grain boundary of a lithium-based composite oxide and/or a secondary particle formed by aggregating at least two lithium-based composite oxides are regions in which a side reaction between a positive electrode active material and an electrolyte solution possibly occur.

According to the present invention, since a lithium-based composite oxide, which is primary particle, constituting the secondary particle, has a single crystal structure, it is possible to reduce a side reaction between a positive electrode active material and an electrolyte solution.

That is, the high-temperature stability and storage stability of a positive electrode active material can be improved by reducing the surface area and grain boundary of the lithium-based composite oxide and/or the secondary particle. As the high-temperature stability and storage stability of the positive electrode active material are improved, it is possible to reduce gas generation caused by the positive electrode active material during the operation and/or storage of the positive electrode active material.

According to the present invention, the structural stability of a lithium composite oxide, and specifically, a positive electrode active material can be improved by a cation-mixing layer present on the surface of a lithium composite oxide constituting the positive electrode active material, which satisfies a grain boundary density condition defined herein.

Above, while the embodiments of the present invention have been described, it will be understood by those of ordinary skill in the art that the present invention may be changed and modified in various ways by addition, alteration, or deletion of components without departing from the spirit of the present invention defined in the appended claims.

What is claimed is:

1. A positive electrode active material, comprising:
a positive electrode active material comprising a lithium-based composite oxide having a single crystal structure, wherein a cation-mixing layer is present on the surface of the lithium-based composite oxide, and
a ratio (d1/x1) of the thickness (d1) of the cation-mixing layer to the average particle size (x1) of primary particles ranges from more than 0.0008 and less than 0.0052, wherein the lithium-based composite oxide is represented by Formula 1 below:

$Li_aNi_{1-(b+c+d+e)}Co_bM1_cM2_dM3_eO_f$      [Formula 1]

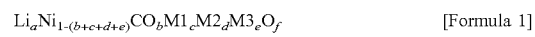

Here, M1 is Mn or Al,
M2 and M3 are each independently selected from Al, Ba, B, Ce, Cr, Mg, Mn, Mo, Na, K, P, Sr, Ti, W, Nb, and Zr, and
M1 to M3 are different metals
($0.90 \leq a \leq 1.05$, $0 \leq b \leq 0.20$, $0 \leq c \leq 0.20$, $0 \leq d \leq 0.05$, $0 \leq e \leq 0.05$, and $1.0 \leq f \leq 2.0$), wherein the cation-mixing layer comprises a composite oxide represented by Formula 2 below:

$Li_gNi_{1-(h+i+j+k)}Co_hM4_iM5_jM6_kO_l$      [Formula 2]

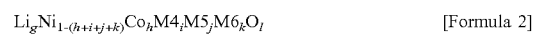

Here, M4 is Mn or Al,
M5 and M6 are each independently selected from Al, Ba, B, Ce, Cr, Mg, Mn, Mo, Na, K, P, Sr, Ti, W, Nb, and Zr, and
M4 to M6 are different metals
($0.0 \leq g \leq 1.05$, $0 \leq h \leq 0.20$, $0 \leq i \leq 0.20$, $0 \leq j \leq 0.05$, $0 \leq k \leq 0.05$, and $1.0 \leq l \leq 2.0$), wherein the crystal structure of the composite oxide represented by Formula 2 is different from the lithium-based composite oxide.

2. The positive electrode active material of claim 1, wherein the positive electrode active material comprises primary particles, which are formed of the lithium-based composite oxide having a single crystal structure, and secondary particles in which the primary particles are aggregated, and
the cation-mixing layer is present on the surface of at least one selected from the primary particle and the secondary particle.

3. The positive electrode active material of claim 2, wherein the cation-mixing layer is present on the surface of the secondary particle, and
a ratio (d2/x2) of the thickness (d2) of the cation-mixing layer to the average particle size (x2) of the secondary particles ranges from more than 0.00014 and less than 0.00281.

4. The positive electrode active material of claim 2, wherein the cation-mixing layer is present on the surfaces of the primary particle and the secondary particle, and
the thickness (d1) of the cation-mixing layer present on the surface of the primary particle is smaller than that of the cation-mixing layer (d2) present on the surface of the secondary particle.

5. The positive electrode active material of claim 4, wherein the ratio (d1/d2) of the thickness (d1) of the cation-mixing layer present on the surface of the primary particle to the thickness (d2) of the cation-mixing layer present on the surface of the secondary particle ranges from more than 0.53 and less than 1.0.

6. The positive electrode active material of claim 1, wherein the proportion of secondary particles having a grain boundary density of 0.5 or less among the plurality of secondary particles constituting the positive electrode active material is 30% or more:

> Grain boundary density=(the number of interfaces between primary particles in secondary particle/the number of primary particles constituting secondary particle).

7. The positive electrode active material of claim 1, wherein the lithium-based composite oxide has an average particle size of 1.0 to 5.0 μm.

8. The positive electrode active material of claim 2, wherein the secondary particle has an average particle size of 1.0 to 20.0 μm.

9. The positive electrode active material of claim 1, wherein the cation-mixing layer has a thickness ranging from more than 0.23 nm and less than 12.04 nm.

10. A positive electrode comprising the positive electrode active material according to claim 1.

11. A lithium secondary battery comprising the positive electrode according to claim 10.

* * * * *